United States Patent
Feng et al.

(10) Patent No.: US 12,545,674 B2
(45) Date of Patent: Feb. 10, 2026

(54) CRYSTAL OF TRIFLUOROMETHYL/CHLORO DISUBSTITUTED SULFONAMIDE SELECTIVE BCL-2 INHIBITOR

(71) Applicant: CHIA TAI TIANQING PHARMACEUTICAL GROUP CO., LTD., Lianyungang (CN)

(72) Inventors: Weiwei Feng, Lianyungang (CN); Yanlong Liu, Lianyungang (CN); Huihui Zhang, Lianyungang (CN); Fei Liu, Lianyungang (CN); Bin Wang, Lianyungang (CN); Yiyan Yao, Lianyungang (CN); Zhilin Chen, Lianyungang (CN); Jinlei Zhu, Lianyungang (CN); Chenghui Lu, Lianyungang (CN)

(73) Assignee: CHIA TAI TIANQING PHARMACEUTICAL GROUP CO., LTD., Lianyungang (CN)

( * ) Notice: Subject to any disclaimer, the term of this patent is extended or adjusted under 35 U.S.C. 154(b) by 611 days.

(21) Appl. No.: 17/922,223

(22) PCT Filed: Apr. 29, 2021

(86) PCT No.: PCT/CN2021/090885
§ 371 (c)(1),
(2) Date: Oct. 28, 2022

(87) PCT Pub. No.: WO2021/219065
PCT Pub. Date: Nov. 4, 2021

(65) Prior Publication Data
US 2023/0174528 A1 Jun. 8, 2023

(30) Foreign Application Priority Data
Apr. 29, 2020 (CN) .......................... 202010355842.4

(51) Int. Cl.
*A61P 35/02* (2006.01)
*C07D 471/04* (2006.01)

(52) U.S. Cl.
CPC ............ *C07D 471/04* (2013.01); *A61P 35/02* (2018.01); *C07B 2200/13* (2013.01)

(58) Field of Classification Search
None
See application file for complete search history.

(56) References Cited

U.S. PATENT DOCUMENTS

| 8,580,794 B2 | 11/2013 | Doherty et al. | |
| 12,319,689 B2 * | 6/2025 | Liu et al. | C07D 471/04 514/253.4 |
| 2003/0124028 A1 * | 7/2003 | Carlson | C40B 60/14 422/68.1 |

FOREIGN PATENT DOCUMENTS

| CN | 102307622 A | 1/2012 |
| CN | 102307872 A | 1/2012 |

(Continued)

OTHER PUBLICATIONS

Lang et al. (Journal of Pharmaceutical and Biomedical Analysis (2013); 84: 177-183) (Year: 2013).*
Variankaval et al. (AIChE Journal (2008);54(7):1682-1688) (Year: 2008).*
Alvarez et al. (Crystal Growth & Design (2009);9:4181-4188) (Year: 2009).*
Morissette et al. (Advanced Drug Delivery Reviews (2004); 56: 275-300) (Year: 2004).*

(Continued)

*Primary Examiner* — Ernst V Arnold
(74) *Attorney, Agent, or Firm* — Maschoff Brennan

(57) ABSTRACT

A crystal of a trifluoromethyl/chloro disubstituted sulfonamide selective BCL-2 inhibitor, specifically related to a crystal of a compound of formula I, a preparation method therefor, and use thereof in preventing and treating diseases related to anti-apoptotic protein BCL-2, such as cancers.

(Continued)

(56) References Cited

FOREIGN PATENT DOCUMENTS

| | | | |
|---|---|---|---|
| CN | 104876927 | A | 9/2015 |
| EP | 2 376 197 | B1 | 2/2017 |
| EP | 3 666 758 | A1 | 6/2020 |
| EP | 3 858 832 | A1 | 8/2021 |
| WO | 2010065865 | | 6/2010 |
| WO | 2010138588 | | 12/2010 |
| WO | 2012071374 | | 5/2012 |
| WO | WO-2019135253 | A1 * | 7/2019 |
| WO | WO-2020088442 | A1 * | 5/2020 ........... A61K 31/496 |

OTHER PUBLICATIONS

English translation of Liu et al. (WO2020088442); 2020: 57 pages). (Year: 2020).*

Censi et al. (Molecules 2015, 20, 18759-18776) (Year: 2015).*

Caira, M.R., "Crystalline Polymorphism of Organic Compounds," Topics in Current Chemistry, vol. 198, pp. 163-208 (1998).

Extended European Search Report dated Mar. 28, 2024 as received in Application No. 21796153.1.

* cited by examiner

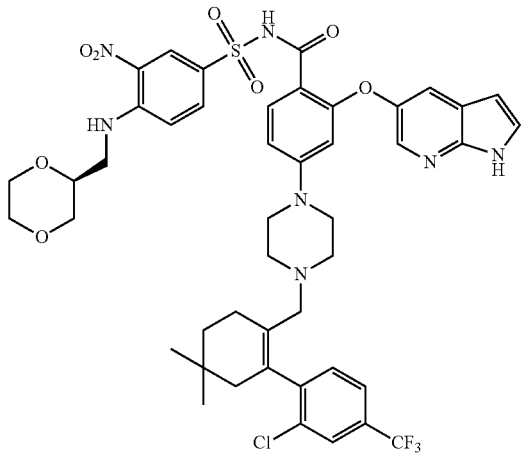

I

20 Claims, 10 Drawing Sheets

CRYSTAL OF TRIFLUOROMETHYL/CHLORO DISUBSTITUTED SULFONAMIDE SELECTIVE BCL-2 INHIBITOR

CROSS-REFERENCE TO RELATED APPLICATIONS

The present application claims benefit and priority to the Chinese Patent No. 202010355842.4 filed with the National Intellectual Property Administration, PRC on Apr. 29, 2020, which is incorporated herein by reference in its entirety.

TECHNICAL FIELD

The present application relates to a crystal of a trifluoromethyl/chloro disubstituted sulfonamide selective BCL-2 inhibitor, a method for preparing the same, and use thereof in preventing and treating a disease associated with anti-apoptotic protein BCL-2, such as a cancer.

BACKGROUND

BCL-2 proteins are classified into three families BCL-2 family (including members such as BCL-2 and BCL-XL), BAX family and BH3-only family Among them, the BCL-2 family plays an anti-apoptotic role, while members of the other two families play a pro-apoptotic role. Anti-apoptotic proteins of the BCL-2 family are associated with many diseases and are being investigated as potential targets of therapeutic drugs. These targets for interventional therapy include, for example, proteins BCL-2 and BCL-XL of the BCL-2 family, etc. Recently, inhibitors for proteins of BCL-2 family have been reported in WO2012071374, WO2010138588 and WO2010065865. Although inhibitors that bind to a target protein with high affinity are introduced therein, binding affinity of compounds is only one of many parameters to be considered. One objective is to produce a compound that preferentially binds to, i.e., has selectivity for, one protein over another. The manifestation of this selectivity, as is well known, is high binding affinity for a specific protein and lower binding affinity for another.

The present application discloses a compound of formula I, which exhibits high selectivity for the effects of anti-apoptotic proteins BCL-2 and BCL-XL and also has superior performance in inhibiting the activity of anti-apoptotic protein BCL-2. Meanwhile, these compounds have better stability in liver microsomes and optimized pharmacokinetic parameters, showing more promising druggability.

It is generally desirable for a drug to perform well in the following aspects: pharmaceutical activity, pharmacokinetics, bioavailability, melting point, stability, hygroscopicity, solubility, etc. The crystalline form of the compound of formula I disclosed herein has lower hygroscopicity and good stability, including stable product purity and content during storage, absence of crystal form transformation, and ease of preparation, and can meet the requirements of drug production, storage, formulation, etc.

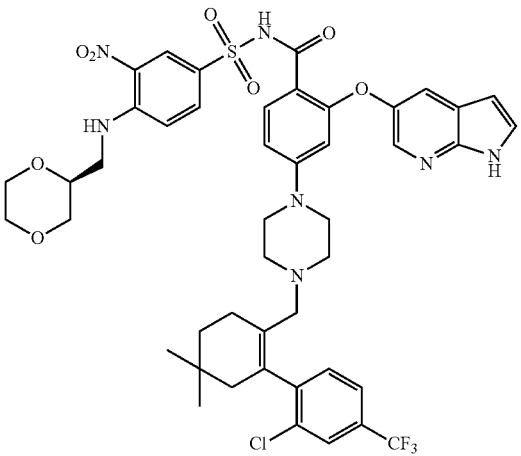

SUMMARY

In one aspect, the present application provides a crystalline form of a compound of formula I,

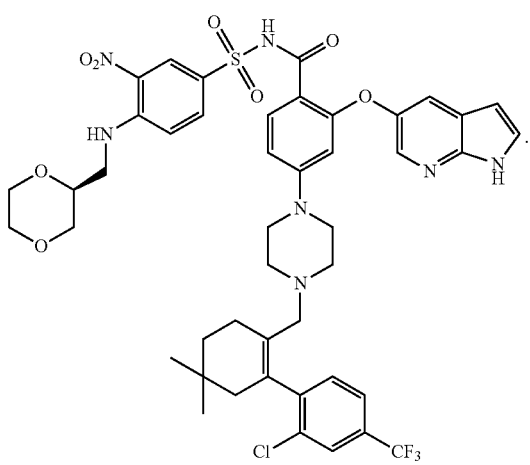

In some embodiments, the crystalline form of the compound of formula I disclosed herein is a crystalline form A, which is characterized by having peaks at 2θ of 5.01, 6.61, 8.12 or 20.13±0.2° in an X-ray powder diffraction pattern; in some embodiments, the crystalline form is characterized by having peaks at 2θ of 5.01, 6.61, 8.12, 10.21, 14.89, 16.63 or 20.13±0.2° in an X-ray powder diffraction pattern; in some embodiments, the crystalline form is characterized by having peaks at 2θ of 5.01, 6.61, 8.12, 10.21, 12.88, 14.89, 16.63, 20.13 or 21.01±0.2° in an X-ray powder diffraction pattern; in some embodiments, the crystalline form is characterized by having peaks at 2θ of 5.01, 6.61, 8.12, 10.21, 12.88, 13.74, 14.89, 16.63, 18.58, 20.13, 21.01 or 26.20±0.2° in an X-ray powder diffraction pattern.

In some other embodiments, the crystalline form of the compound of formula I disclosed herein is a crystalline form A, which is characterized by having at least 7 or at least 8 diffraction peaks at 2θ selected from the group consisting of 5.01, 6.61, 8.12, 10.21, 12.88, 14.89, 16.63, 20.13 or 21.01±0.2° in an X-ray powder diffraction pattern.

In some embodiments of the present application, the positions and relative intensities of diffraction peaks in the XRPD pattern of the crystalline form A described above are shown in Table 1 below:

TABLE 1

Analysis data of XRPD pattern of crystalline form A

| No. | 2θ angle (±0.20°) | Relative intensity |
|---|---|---|
| 1 | 5.01 | 49.6% |
| 2 | 6.61 | 63.2% |
| 3 | 8.12 | 42.7% |
| 4 | 10.21 | 44.0% |
| 5 | 12.88 | 36.8% |
| 6 | 12.90 | 39.2% |
| 7 | 13.74 | 24.6% |
| 8 | 14.89 | 58.1% |
| 9 | 16.34 | 63.3% |
| 10 | 16.63 | 82.6% |
| 11 | 18.58 | 33.0% |
| 12 | 20.13 | 100.0% |
| 13 | 21.01 | 65.5% |
| 14 | 26.20 | 23.6% |
| 15 | 28.40 | 15.3%. |

In some embodiments, the crystalline form of the compound of formula I disclosed herein is a crystalline form A having an X-ray powder diffraction pattern shown in FIG. 1.

In some embodiments, the crystalline form of the compound of formula I disclosed herein is a crystalline form A having a DSC pattern shown in FIG. 2.

In some embodiments, the crystalline form of the compound of formula I disclosed herein is a crystalline form A having a TG pattern shown in FIG. 3.

The crystalline form A of the compound of formula I may be present in a non-solvate crystalline form or a solvate crystalline form, where the solvate refers to a solvate formed by an organic solvent and/or water and the corresponding compound.

In some embodiments, the present application provides a method for preparing the crystalline form A of the compound of formula I, comprising: mixing the compound of formula I with dichloromethane and methanol for dissolution and clarification, and concentrating the solution to separate a solid. In some embodiments, the volume ratio of dichloromethane to methanol is selected from the group consisting of 20:1-100:1.

In some embodiments, in the method described above, the volume/mass ratio of dichloromethane to the compound of formula I is 20-100 mL/g. In some embodiments, the volume/mass ratio of dichloromethane to the compound of formula I is 40-60 mL/g, preferably 50-60 mL/g; the volume/mass ratio of the methanol to the compound of formula I is 0.1-10 mL/g, preferably 0.5-5 mL/g.

In some embodiments, in the method described above, concentration at reduced pressure is employed. For example, the method for preparing the crystalline form A of the compound of formula I disclosed herein comprises: dissolving the compound of formula I in a mixed solution of dichloromethane and methanol, stirring the mixture for dissolution and clarification, and concentrating the resulting solution at reduced pressure to obtain the crystalline form A.

In some embodiments, the crystalline form of the compound of formula I disclosed herein is a crystalline form B, which is characterized by having peaks at 2θ of 5.31, 12.64, 19.08 or 24.21±0.2° in an X-ray powder diffraction pattern; in some embodiments, the crystalline form is characterized by having peaks at 2θ of 5.31, 10.65, 12.64, 14.23, 19.08, 19.91, 22.71 or 24.21±0.2° in an X-ray powder diffraction pattern; in some embodiments, the crystalline form is characterized by having peaks at 2θ of 5.31, 9.80, 10.65, 12.12, 12.64, 14.23, 16.04, 18.13, 19.08, 19.91, 22.71, 24.21 or 25.93±0.2° in an X-ray powder diffraction pattern; in some embodiments, the crystalline form is characterized by having peaks at 2θ of 5.31, 9.80, 10.65, 12.12, 12.64, 13.57, 13.82, 14.23, 15.17, 16.04, 17.64, 18.13, 19.08, 19.91, 20.34, 22.71, 22.99, 23.45, 24.21, 25.65 or 25.93±0.2° in an X-ray powder diffraction pattern; and, in some embodiments, the crystalline form is characterized by having peaks at 2θ of 5.31, 9.50, 9.80, 10.65, 11.41, 12.12, 12.64, 13.57, 13.82, 14.23, 15.17, 16.04, 16.64, 17.10, 17.64, 18.13, 18.33, 18.73, 19.08, 19.60, 19.91, 20.34, 21.22, 21.93, 22.71, 22.99, 23.45, 24.21, 25.65 or 25.93±0.2° in an X-ray powder diffraction pattern.

In some other embodiments, the crystalline form of the compound of formula I disclosed herein is a crystalline form B, which is characterized by having at least 6 or at least 7 diffraction peaks at 2θ selected from the group consisting of 5.31, 10.65, 12.64, 14.23, 19.08, 19.91, 22.71 or 24.21±0.2° in an X-ray powder diffraction pattern.

In some embodiments of the present application, the positions and relative intensities of diffraction peaks in the XRPD pattern of the crystalline form B described above are shown in Table 2 below:

TABLE 2

Analysis data of XRPD pattern of crystalline form B

| No. | 2θ angle (±0.20°) | Relative intensity |
|---|---|---|
| 1 | 5.31 | 100.0% |
| 2 | 7.24 | 3.4% |
| 3 | 8.07 | 2.1% |
| 4 | 9.50 | 4.0% |
| 5 | 9.80 | 11.5% |
| 6 | 10.65 | 30.5% |
| 7 | 11.41 | 4.7% |
| 8 | 12.12 | 10.2% |
| 9 | 12.64 | 47.5% |
| 10 | 13.57 | 6.7% |
| 11 | 13.82 | 8.1% |
| 12 | 14.23 | 30.5% |
| 13 | 14.86 | 3.3% |
| 14 | 15.17 | 9.2% |
| 15 | 16.04 | 18.1% |
| 16 | 16.64 | 5.6% |
| 17 | 17.10 | 3.9% |
| 18 | 17.64 | 6.9% |
| 19 | 18.13 | 17.3% |
| 20 | 18.33 | 7.5% |
| 21 | 18.73 | 5.0% |
| 22 | 19.08 | 52.7% |
| 23 | 19.60 | 7.7% |
| 24 | 19.91 | 40.3% |
| 25 | 20.34 | 8.9% |
| 26 | 20.82 | 2.4% |
| 27 | 21.22 | 4.5% |
| 28 | 21.60 | 3.5% |
| 29 | 21.93 | 4.6% |
| 30 | 22.71 | 30.1% |
| 31 | 22.99 | 13.8% |
| 32 | 23.45 | 8.3% |
| 33 | 23.76 | 4.5% |
| 34 | 24.21 | 52.1% |
| 35 | 24.91 | 1.1% |
| 36 | 25.20 | 2.2% |
| 37 | 25.65 | 8.8% |
| 38 | 25.93 | 10.1% |
| 39 | 26.47 | 3.4% |
| 40 | 26.97 | 2.1% |

TABLE 2-continued

Analysis data of XRPD pattern of crystalline form B

| No. | 2θ angle (±0.20°) | Relative intensity |
|---|---|---|
| 41 | 27.39 | 1.7% |
| 42 | 27.86 | 3.9% |
| 43 | 28.33 | 2.1% |
| 44 | 29.05 | 2.3% |
| 45 | 29.48 | 2.4% |
| 46 | 32.37 | 2.4% |
| 47 | 33.20 | 3.6% |
| 48 | 33.64 | 2.2% |
| 49 | 38.83 | 2.7%. |

In some embodiments, the crystalline form of the compound of formula I disclosed herein is a crystalline form B having an X-ray powder diffraction pattern shown in FIG. 4.

In some embodiments, the crystalline form of the compound of formula I disclosed herein is a crystalline form B having an endothermic peak with an onset point at 179.42±5° C. in a DSC pattern.

In some embodiments, the crystalline form of the compound of formula I disclosed herein is a crystalline form B having a DSC pattern shown in FIG. 5.

In some embodiments, the crystalline form of the compound of formula I disclosed herein is a crystalline form B having a TG pattern shown in FIG. 6.

The crystalline form B of the compound of formula I may be present in a non-solvate crystalline form or a solvate crystalline form, where the solvate refers to a solvate formed by an organic solvent and/or water and the corresponding compound.

In another aspect, the present application provides a method for preparing the crystalline form B of the compound of formula I, comprising: mixing the compound of formula I with acetone, and separating a solid.

In some embodiments, the volume/mass ratio of acetone to the compound of formula I is 1-50 mL/g. In some embodiments, the volume/mass ratio described above is 5-20 mL/g, preferably 10 mL/g.

In some embodiments, the method for preparing the crystalline form B of the compound of formula I disclosed herein comprises: mixing the compound of formula I with acetone, stirring the mixture at room temperature, filtering the resulting mixture to collect a precipitate, and drying the precipitate in vacuum to obtain the crystalline form B. In some embodiments, in the method described above, the drying in vacuum is performed at 40-60° C.

In some embodiments, the crystalline form of the compound of formula I disclosed herein is a crystalline form C, which is characterized by having peaks at 2θ of 5.52, 7.56, 9.22, 11.04 or 17.43±0.2° in an X-ray powder diffraction pattern; in some embodiments, the crystalline form is characterized by having peaks at 2θ of 5.52, 7.56, 8.29, 9.22, 11.04, 15.81, 17.43, 18.51 or 22.59±0.2° in an X-ray powder diffraction pattern; in some embodiments, the crystalline form is characterized by having peaks at 2θ of 5.52, 7.56, 8.29, 9.22, 11.04, 15.17, 15.81, 17.43, 18.51 or 20.40±0.2° in an X-ray powder diffraction pattern; in some embodiments, the crystalline form is characterized by having peaks at 2θ of 5.52, 7.56, 8.29, 9.22, 11.04, 15.17, 15.81, 17.00, 17.43, 18.51, 19.70, 20.01, 20.40, 20.75 or 22.59±0.2° in an X-ray powder diffraction pattern; and, in some embodiments, the crystalline form is characterized by having peaks at 2θ of 5.52, 7.56, 8.29, 9.22, 10.66, 11.04, 12.94, 14.69, 15.17, 15.81, 16.63, 17.00, 17.43, 18.51, 19.70, 20.01, 20.40, 20.75, 22.59, 25.88 or 26.12±0.2° in an X-ray powder diffraction pattern.

In some other embodiments, the crystalline form of the compound of formula I disclosed herein is a crystalline form C, which is characterized by having at least 7 or at least 8 diffraction peaks at 2θ selected from the group consisting of 5.52, 7.56, 8.29, 9.22, 11.04, 15.81, 17.43, 18.51 or 22.59±0.2° in an X-ray powder diffraction pattern.

In some embodiments of the present application, the positions and relative intensities of diffraction peaks in the XRPD pattern of the crystalline form C described above are shown in Table 3 below:

TABLE 3

Analysis data of XRPD pattern of crystalline form C

| No. | 2θ angle (±0.20°) | Relative intensity |
|---|---|---|
| 1 | 4.84 | 9.4% |
| 2 | 5.52 | 85.9% |
| 3 | 7.56 | 78.0% |
| 4 | 8.29 | 48.4% |
| 5 | 9.22 | 57.1% |
| 6 | 10.66 | 35.0% |
| 7 | 11.04 | 50.8% |
| 8 | 12.94 | 28.2% |
| 9 | 13.56 | 10.7% |
| 10 | 14.69 | 24.4% |
| 11 | 15.17 | 57.3% |
| 12 | 15.81 | 44.4% |
| 13 | 16.63 | 25.9% |
| 14 | 17.00 | 33.8% |
| 15 | 17.43 | 65.0% |
| 16 | 18.51 | 45.1% |
| 17 | 19.70 | 61.1% |
| 18 | 20.01 | 73.2% |
| 19 | 20.40 | 100.0% |
| 20 | 20.75 | 58.7% |
| 21 | 21.38 | 23.7% |
| 22 | 22.59 | 40.7% |
| 23 | 23.57 | 12.0% |
| 24 | 24.64 | 9.2% |
| 25 | 24.89 | 13.0% |
| 26 | 25.88 | 23.9% |
| 27 | 26.12 | 23.3% |
| 28 | 26.68 | 16.6% |
| 29 | 27.33 | 9.2%. |

In some embodiments, the crystalline form of the compound of formula I disclosed herein is a crystalline form C having an X-ray powder diffraction pattern shown in FIG. 7.

In some embodiments, the crystalline form of the compound of formula I disclosed herein is a crystalline form C having an endothermic peak with an onset point at 205.65±5° C. in a DSC pattern.

In some embodiments, the crystalline form of the compound of formula I disclosed herein is a crystalline form C having a DSC pattern shown in FIG. 8.

In some embodiments, the crystalline form of the compound of formula I disclosed herein is a crystalline form C having a TG pattern shown in FIG. 9.

The crystalline form C of the compound of formula I may be present in a non-solvate crystalline form or a solvate crystalline form, where the solvate refers to a solvate formed by an organic solvent and/or water and the corresponding compound.

In some embodiments, the present application provides a method for preparing the crystalline form C of the compound of formula I, comprising: mixing the compound of formula I with methanol and methyl tert-butyl ether, and separating a solid.

In some embodiments, in the method described above, the volume/mass ratio of methanol to the compound of formula I is 5-100 mL/g, and the volume/mass ratio of methyl tert-butyl ether to the compound of formula I is 5-100 mL/g; in some embodiments, the volume/mass ratio of methanol to the compound of formula I is 10-50 mL/g, preferably 25 mL/g, and the volume/mass ratio of methyl tert-butyl ether to the compound of formula I is 10-50 mL/g, preferably 25 mL/g.

In some embodiments, the method for preparing the crystalline form C of the compound of formula I disclosed herein comprises: mixing the compound of formula I with methanol and methyl tert-butyl ether, stirring the mixture at room temperature, filtering the resulting mixture to collect a precipitate, and drying the precipitate in vacuum to obtain the crystalline form C. In some embodiments, in the method described above, the drying in vacuum is performed at 40-60° C.

In some embodiments, the crystalline form of the compound of formula I disclosed herein is a crystalline form D, which is characterized by having peaks at 2θ of 4.78, 12.83, 16.24 or 22.33±0.2° in an X-ray powder diffraction pattern; in some embodiments, the crystalline form is characterized by having peaks at 2θ of 4.78, 10.52, 12.83, 16.24, 18.44, 19.41, 22.33 or 23.20±0.2° in an X-ray powder diffraction pattern; in some embodiments, the crystalline form is characterized by having peaks at 2θ of 4.78, 9.63, 10.52, 12.83, 13.48, 15.79, 16.24, 17.89, 18.44, 19.41, 19.61, 22.33 or 23.20±0.2° in an X-ray powder diffraction pattern; in some embodiments, the crystalline form is characterized by having peaks at 2θ of 4.78, 7.46, 9.63, 10.52, 11.17, 12.83, 13.48, 14.42, 15.79, 16.24, 17.89, 18.44, 19.41, 19.61, 20.44, 22.33, 23.20, 26.48 or 27.05±0.2° in an X-ray powder diffraction pattern.

In some other embodiments, the crystalline form of the compound of formula I disclosed herein is a crystalline form D, which is characterized by having at least 6 or at least 7 diffraction peaks at 2θ selected from the group consisting of 4.78, 10.52, 12.83, 16.24, 18.44, 19.41, 22.33 or 23.20±0.2° in an X-ray powder diffraction pattern.

In some embodiments of the present application, the positions and relative intensities of diffraction peaks in the XRPD pattern of the crystalline form D described above are shown in Table 4 below:

TABLE 4

Analysis data of XRPD pattern of crystalline form D

| No. | 2θ angle (±0.20°) | Relative intensity |
|---|---|---|
| 1 | 4.78 | 100.0% |
| 2 | 7.46 | 9.4% |
| 3 | 7.92 | 7.4% |
| 4 | 8.05 | 8.2% |
| 5 | 9.63 | 15.8% |
| 6 | 10.52 | 30.5% |
| 7 | 11.17 | 12.5% |
| 8 | 12.83 | 63.6% |
| 9 | 13.48 | 19.9% |
| 10 | 14.42 | 11.4% |
| 11 | 15.03 | 4.6% |
| 12 | 15.79 | 32.2% |
| 13 | 16.24 | 56.6% |
| 14 | 16.70 | 7.2% |
| 15 | 17.89 | 28.3% |
| 16 | 18.44 | 52.3% |
| 17 | 19.41 | 56.9% |
| 18 | 19.61 | 50.6% |
| 19 | 20.44 | 12.7% |

TABLE 4-continued

Analysis data of XRPD pattern of crystalline form D

| No. | 2θ angle (±0.20°) | Relative intensity |
|---|---|---|
| 20 | 21.16 | 4.5% |
| 21 | 22.33 | 56.0% |
| 22 | 23.20 | 41.6% |
| 23 | 25.06 | 8.5% |
| 24 | 26.48 | 8.2% |
| 25 | 27.05 | 12.7% |
| 26 | 29.63 | 4.1%. |

In some embodiments, the crystalline form of the compound of formula I disclosed herein is a crystalline form D having an X-ray powder diffraction pattern shown in FIG. 10.

In some embodiments, the crystalline form of the compound of formula I disclosed herein is a crystalline form D having an endothermic peak with an onset point at 176.47±5° C. in a DSC pattern.

In some embodiments, the crystalline form of the compound of formula I disclosed herein is a crystalline form D having a DSC pattern shown in FIG. 11.

In some embodiments, the crystalline form of the compound of formula I disclosed herein is a crystalline form D having a TG pattern shown in FIG. 12.

The crystalline form D of the compound of formula I may be present in a non-solvate crystalline form or a solvate crystalline form, where the solvate refers to a solvate formed by an organic solvent and/or water and the corresponding compound.

In another aspect, the present application provides a method for preparing the crystalline form D of the compound of formula I, comprising: mixing the compound of formula I with a solvent selected from the group consisting of tetrahydrofuran, a mixture of tetrahydrofuran and water, isopropanol and 1,4-dioxane, and separating a solid.

In the method described above, the volume/mass ratio of the compound of formula I to the solvent is 5-200 mL/g; in some embodiments, the volume/mass ratio described above is 20-100 mL/g.

In some embodiments, the volume ratio of tetrahydrofuran to water in the mixture of tetrahydrofuran and water is 20:1-0.1:1, preferably 10:1-0.5:1.

In some embodiments, the method for preparing the crystalline form D of the compound of formula I disclosed herein comprises: mixing the compound of formula I with the solvent, stirring the mixture at room temperature, filtering the resulting mixture to collect a precipitate, and drying the precipitate by air blasting to obtain the crystalline form D.

In some embodiments, in the method described above, the drying by air blasting is performed at 40-60° C.

In some embodiments, the method for preparing the crystalline form D of the compound of formula I disclosed herein comprises: mixing the compound of formula I with the solvent, stirring the mixture for dissolution at room temperature, filtering the resulting mixture to obtain a supernatant, transferring the supernatant into a clean container, and slowly evaporating the solvent at room temperature to obtain the crystalline form D.

In some embodiments, the crystalline form of the compound of formula I disclosed herein is a crystalline form E, which is characterized by having peaks at 2θ of 4.22, 10.72, 15.17 or 15.65±0.2° in an X-ray powder diffraction pattern; in some embodiments, the crystalline form is characterized by having peaks at 2θ of 4.22, 10.72, 14.62, 15.17, 15.65, 17.54, 19.55, 19.80 or 21.50±0.2° in an X-ray powder diffraction pattern; in some embodiments, the crystalline form is characterized by having peaks at 2θ of 4.22, 10.72, 13.82, 14.62, 15.17, 15.65, 16.92, 17.54, 19.55, 19.80, 21.50, 22.76, 23.35 or 26.06±0.2° in an X-ray powder diffraction pattern; in some embodiments, the crystalline form is characterized by having peaks at 2θ of 4.22, 7.99, 8.75, 9.91, 10.72, 11.66, 12.75, 13.82, 14.62, 15.17, 15.65, 16.24, 16.92, 17.54, 19.04, 19.55, 19.80, 20.18, 21.50, 22.76, 23.35, 26.06, 26.91, 29.82 or 30.56±0.2° in an X-ray powder diffraction pattern.

In some other embodiments, the crystalline form of the compound of formula I disclosed herein is a crystalline form E, which is characterized by having at least 7 or at least 8 diffraction peaks at 2θ selected from the group consisting of 4.22, 10.72, 14.62, 15.17, 15.65, 17.54, 19.55, 19.80 or 21.50±0.2° in an X-ray powder diffraction pattern.

In some embodiments of the present application, the positions and relative intensities of diffraction peaks in the XRPD pattern of the crystalline form E described above are shown in Table 5 below:

TABLE 5

Analysis data of XRPD pattern of crystalline form E

| No. | 2θ angle (±0.20°) | Relative intensity |
|---|---|---|
| 1 | 4.22 | 100.0% |
| 2 | 7.23 | 3.2% |
| 3 | 7.99 | 9.2% |
| 4 | 8.39 | 6.7% |
| 5 | 8.75 | 11.4% |
| 6 | 9.91 | 9.4% |
| 7 | 10.72 | 89.7% |
| 8 | 11.66 | 13.8% |
| 9 | 12.75 | 9.1% |
| 10 | 13.20 | 6.2% |
| 11 | 13.82 | 28.2% |
| 12 | 14.62 | 35.6% |
| 13 | 15.17 | 44.4% |
| 14 | 15.65 | 69.8% |
| 15 | 16.24 | 12.9% |
| 16 | 16.92 | 15.0% |
| 17 | 17.54 | 33.1% |
| 18 | 18.13 | 4.0% |
| 19 | 19.04 | 11.6% |
| 20 | 19.55 | 34.4% |
| 21 | 19.80 | 32.9% |
| 22 | 20.18 | 18.0% |
| 23 | 20.79 | 6.2% |
| 24 | 21.50 | 30.0% |
| 25 | 22.08 | 7.6% |
| 26 | 22.76 | 20.9% |
| 27 | 23.35 | 21.7% |
| 28 | 23.96 | 6.4% |
| 29 | 24.83 | 3.5% |
| 30 | 26.06 | 17.8% |
| 31 | 26.91 | 9.4% |
| 32 | 28.12 | 3.6% |
| 33 | 29.82 | 9.7% |
| 34 | 30.56 | 10.3% |
| 35 | 32.66 | 3.4%. |

In some embodiments, the crystalline form of the compound of formula I disclosed herein is a crystalline form E having an X-ray powder diffraction pattern shown in FIG. 13.

In some embodiments, the crystalline form of the compound of formula I disclosed herein is a crystalline form E having an endothermic peak with an onset point at 145.48±5° C. in a DSC pattern.

In some embodiments, the crystalline form of the compound of formula I disclosed herein is a crystalline form E having a DSC pattern shown in FIG. 14.

In some embodiments, the crystalline form of the compound of formula I disclosed herein is a crystalline form E having a TG pattern shown in FIG. 15.

The crystalline form E of the compound of formula I may be present in a non-solvate crystalline form or a solvate crystalline form, where the solvate refers to a solvate formed by an organic solvent and/or water and the corresponding compound.

In some embodiments, the present application provides a method for preparing the crystalline form E of the compound of formula I, comprising: mixing the compound of formula I with p-xylene, and separating a solid and drying.

In some embodiments, the drying is a vacuum drying at 50-120° C., preferably 80-100° C., for 5-10 h.

In the method described above, the volume/mass ratio of p-xylene to the compound of formula I is 5-55 mL/g; in some embodiments, the volume/mass ratio is 10-40 mL/g, preferably 20 mL/g.

In some embodiments, the present invention provides a method for preparing crystalline form E of the compound of formula I, comprising: mixing the compound of formula I with a solvent, stirring the mixture at room temperature, filtering the resulting mixture to collect a solid precipitate, and drying the solid obtained by filtration in vacuum to obtain the crystalline form E.

In some embodiments, the solid obtained by filtering is dried in vacuum at 50-120° C. or at 80-100° C. In some embodiments, the solid obtained by filtration is dried in vacuum at 50-120° C., preferably 80-100° C., for 5-10 h.

In some embodiments, the crystalline form of the compound of formula I disclosed herein is a crystalline form F, which is characterized by having peaks at 2θ of 4.54, 9.08 or 19.24±0.2° in an X-ray powder diffraction pattern; in some embodiments, the crystalline form is characterized by having peaks at 2θ of 4.54, 9.08, 14.90, 18.25, 19.24, 22.86 or 23.50±0.2° in an X-ray powder diffraction pattern; in some embodiments, the crystalline form is characterized by having peaks at 2θ of 4.54, 9.08, 13.66, 14.90, 17.46, 18.25, 19.24, 22.86, 23.50, 24.75 or 27.51±0.2° in an X-ray powder diffraction pattern; in some embodiments, the crystalline form is characterized by having peaks at 2θ of 4.54, 8.20, 9.08, 13.66, 13.97, 14.51, 14.90, 15.51, 16.63, 17.46, 18.25, 19.24, 19.82, 21.11, 22.37, 22.86, 23.50, 24.75 or 27.51±0.2° in an X-ray powder diffraction pattern.

In some other embodiments, the crystalline form of the compound of formula I disclosed herein is a crystalline form F, which is characterized by having at least 8, at least 9 or at least 10 diffraction peaks at 2θ selected from the group consisting of 4.54, 9.08, 13.66, 14.90, 17.46, 18.25, 19.24, 22.86, 23.50, 24.75 or 27.51±0.2° in an X-ray powder diffraction pattern.

In some embodiments of the present application, the positions and relative intensities of diffraction peaks in the XRPD pattern of the crystalline form F described above are shown in Table 6 below:

TABLE 6

Analysis data of XRPD pattern of crystalline form F

| No. | 2θ angle (±0.20°) | Relative intensity |
|---|---|---|
| 1 | 4.54 | 100.0% |
| 2 | 8.20 | 6.4% |

TABLE 6-continued

Analysis data of XRPD pattern of crystalline form F

| No. | 2θ angle (±0.20°) | Relative intensity |
|---|---|---|
| 3 | 8.98 | 42.5% |
| 4 | 9.08 | 58.5% |
| 5 | 11.90 | 4.5% |
| 6 | 12.87 | 2.9% |
| 7 | 13.66 | 20.8% |
| 8 | 13.97 | 6.7% |
| 9 | 14.51 | 6.0% |
| 10 | 14.90 | 33.1% |
| 11 | 15.20 | 3.8% |
| 12 | 15.51 | 5.1% |
| 13 | 16.03 | 3.1% |
| 14 | 16.63 | 9.2% |
| 15 | 17.09 | 3.3% |
| 16 | 17.46 | 21.7% |
| 17 | 18.25 | 25.1% |
| 18 | 18.56 | 3.0% |
| 19 | 19.24 | 98.9% |
| 20 | 19.82 | 10.2% |
| 21 | 20.03 | 6.2% |
| 22 | 20.72 | 2.4% |
| 23 | 21.11 | 6.1% |
| 24 | 21.68 | 3.4% |
| 25 | 22.37 | 11.4% |
| 26 | 22.86 | 30.3% |
| 27 | 23.50 | 38.4% |
| 28 | 23.71 | 7.2% |
| 29 | 24.75 | 16.2% |
| 30 | 27.10 | 3.7% |
| 31 | 27.51 | 13.6% |
| 32 | 27.98 | 4.4% |
| 33 | 28.60 | 3.8% |
| 34 | 28.98 | 4.4% |
| 35 | 31.56 | 2.7% |
| 36 | 32.24 | 2.9% |
| 37 | 32.43 | 3.5% |
| 38 | 33.16 | 2.2%. |

In some embodiments, the crystalline form of the compound of formula I disclosed herein is a crystalline form F having an X-ray powder diffraction pattern shown in FIG. 16.

In some embodiments, the crystalline form of the compound of formula I disclosed herein is a crystalline form F having an endothermic peak with an onset point at 171.37±5° C. in a DSC pattern.

In some embodiments, the crystalline form of the compound of formula I disclosed herein is a crystalline form F having a DSC pattern shown in FIG. 17.

In some embodiments, the crystalline form of the compound of formula I disclosed herein is a crystalline form F having a TG pattern shown in FIG. 18.

The crystalline form F of the compound of formula I may be present in a non-solvate crystalline form or a solvate crystalline form, where the solvate refers to a solvate formed by an organic solvent and/or water and the corresponding compound.

In another aspect, the present application provides a method for preparing the crystalline form F of the compound of formula I, comprising: mixing the compound of formula I with acetonitrile or nitromethane, and separating a solid.

In the method described above, the volume/mass ratio of acetonitrile or nitromethane to the compound of formula I is 5-200 mL/g; in some embodiments, the above volume/mass ratio is 20-100 mL/g, preferably 50 mL/g.

In some embodiments, the method for preparing the crystalline form F of the compound of formula I disclosed herein comprises: mixing the compound of formula I with acetonitrile or nitromethane, stirring the mixture at room temperature, filtering the resulting mixture to collect a precipitate, and drying the precipitate in vacuum to obtain the crystalline form F. In some embodiments, in the method described above, the drying in vacuum is performed at 40-60° C.

In some embodiments, the crystalline form of the compound of formula I disclosed herein is a crystalline form G, which is characterized by having peaks at 2θ of 3.84, 10.39, 13.39 or 20.63±0.2° in an X-ray powder diffraction pattern; in some embodiments, the crystalline form is characterized by having peaks at 2θ of 3.84, 10.39, 11.22, 13.39, 15.55, 16.78, 20.01 or 20.63±0.2° in an X-ray powder diffraction pattern; in some embodiments, the crystalline form is characterized by having peaks at 2θ of 3.84, 7.72, 9.56, 10.39, 11.22, 12.47, 13.39, 14.01, 15.55, 16.78, 19.02, 20.01 or 20.63±0.2° in an X-ray powder diffraction pattern; in some embodiments, the crystalline form is characterized by having peaks at 2θ of 3.84, 6.69, 7.72, 9.56, 10.39, 11.22, 12.47, 13.39, 14.01, 15.00, 15.55, 16.78, 18.59, 19.02, 19.47, 20.01, 20.63, 22.50, 23.44, 23.69, 24.11, 25.48 or 26.47±0.2° in an X-ray powder diffraction pattern.

In some other embodiments, the crystalline form of the compound of formula I disclosed herein is a crystalline form G, which is characterized by having at least 6 or at least 7 diffraction peaks at 2θ selected from the group consisting of 3.84, 10.39, 11.22, 13.39, 15.55, 16.78, 20.01 or 20.63±0.2° in an X-ray powder diffraction pattern.

In some embodiments of the present application, the positions and relative intensities of diffraction peaks in the XRPD pattern of the crystalline form G described above are shown in Table 7 below:

TABLE 7

Analysis data of XRPD pattern of crystalline form G

| No. | 2θ angle (±0.20°) | Relative intensity |
|---|---|---|
| 1 | 3.84 | 81.4% |
| 2 | 6.69 | 18.5% |
| 3 | 7.72 | 32.0% |
| 4 | 9.56 | 27.0% |
| 5 | 10.39 | 46.1% |
| 6 | 11.22 | 34.2% |
| 7 | 12.47 | 30.0% |
| 8 | 13.39 | 54.4% |
| 9 | 14.01 | 32.6% |
| 10 | 15.00 | 16.7% |
| 11 | 15.55 | 41.8% |
| 12 | 16.12 | 7.0% |
| 13 | 16.78 | 41.6% |
| 14 | 18.59 | 18.8% |
| 15 | 19.02 | 27.7% |
| 16 | 19.47 | 20.4% |
| 17 | 20.01 | 47.3% |
| 18 | 20.63 | 100.0% |
| 19 | 22.50 | 11.4% |
| 20 | 23.44 | 13.2% |
| 21 | 23.69 | 17.6% |
| 22 | 24.11 | 24.1% |
| 23 | 25.48 | 9.5% |
| 24 | 26.47 | 12.2% |
| 25 | 27.56 | 8.3% |
| 26 | 28.53 | 6.8% |
| 27 | 29.99 | 4.9% |
| 28 | 31.23 | 6.3% |
| 29 | 34.10 | 5.2%. |

In some embodiments, the crystalline form of the compound of formula I disclosed herein is a crystalline form G having an X-ray powder diffraction pattern shown in FIG. 19.

The crystalline form G of the compound of formula I may be present in a non-solvate crystalline form or a solvate crystalline form, where the solvate refers to a solvate formed by an organic solvent and/or water and the corresponding compound.

In some embodiments, the present application provides a method for preparing the crystalline form G of the compound of formula I, comprising: mixing the compound of formula I with p-xylene, and separating a solid without drying.

In the method described above, the volume/mass ratio of p-xylene to the compound of formula I is 60-200 mL/g; in some embodiments, the volume/mass ratio is 80-100 mL/g, preferably 94 mL/g.

In one embodiment, the method for preparing the crystalline form G of the compound of formula I disclosed herein comprises: mixing the compound of formula I with p-xylene, stirring the mixture at room temperature, filtering the resulting mixture to collect a precipitate, and drying the precipitate to obtain the crystalline form G.

In some embodiments, the crystalline form of the compound of formula I disclosed herein is a crystalline form H, which is characterized by having peaks at 2θ of 4.65, 12.23, 14.09 or 22.04±0.2° in an X-ray powder diffraction pattern; in some embodiments, the crystalline form is characterized by having peaks at 2θ of 4.65, 9.36, 12.23, 13.33, 14.09, 17.27, 19.37, 22.04 or 22.95±0.2° in an X-ray powder diffraction pattern; in some embodiments, the crystalline form is characterized by having peaks at 2θ of 4.65, 9.36, 10.41, 12.23, 13.33, 14.09, 17.27, 18.88, 19.37, 20.58, 22.04, 22.49, 22.95 or 23.69±0.2° in an X-ray powder diffraction pattern; in some embodiments, the crystalline form is characterized by having peaks at 2θ of 4.65, 7.20, 9.36, 10.41, 11.12, 12.23, 13.33, 14.09, 15.44, 16.41, 16.68, 17.27, 18.31, 18.88, 19.37, 20.58, 22.04, 22.49, 22.95, 23.69 or 25.12±0.2° in an X-ray powder diffraction pattern.

In some other embodiments, the crystalline form of the compound of formula I disclosed herein is a crystalline form H, which is characterized by having at least 7 or at least 8 diffraction peaks at 2θ selected from the group consisting of 4.65, 9.36, 12.23, 13.33, 14.09, 17.27, 19.37, 22.04 or 22.95±0.2° in an X-ray powder diffraction pattern.

In some embodiments of the present application, the positions and relative intensities of diffraction peaks in the XRPD pattern of the crystalline form H described above are shown in Table 8 below:

TABLE 8

Analysis data of XRPD pattern of crystalline form H

| No. | 2θ angle (±0.20°) | Relative intensity |
|---|---|---|
| 1 | 4.65 | 100.0% |
| 2 | 7.20 | 5.8% |
| 3 | 7.44 | 2.4% |
| 4 | 8.15 | 4.2% |
| 5 | 9.36 | 16.3% |
| 6 | 9.62 | 4.2% |
| 7 | 10.41 | 11.0% |
| 8 | 10.68 | 3.4% |
| 9 | 11.12 | 5.0% |
| 10 | 12.23 | 27.6% |
| 11 | 13.33 | 17.7% |
| 12 | 14.09 | 23.1% |
| 13 | 15.44 | 6.2% |
| 14 | 16.41 | 9.7% |
| 15 | 16.68 | 6.9% |
| 16 | 17.27 | 20.8% |

TABLE 8-continued

Analysis data of XRPD pattern of crystalline form H

| No. | 2θ angle (±0.20°) | Relative intensity |
|---|---|---|
| 17 | 17.74 | 3.9% |
| 18 | 18.31 | 5.7% |
| 19 | 18.88 | 15.0% |
| 20 | 19.37 | 27.5% |
| 21 | 19.71 | 10.5% |
| 22 | 20.58 | 10.0% |
| 23 | 21.37 | 4.0% |
| 24 | 22.04 | 51.0% |
| 25 | 22.49 | 12.9% |
| 26 | 22.95 | 21.3% |
| 27 | 23.69 | 12.2% |
| 28 | 25.12 | 8.8% |
| 29 | 25.39 | 4.9% |
| 30 | 26.23 | 4.3% |
| 31 | 26.66 | 5.2% |
| 32 | 27.50 | 4.1% |
| 33 | 29.36 | 4.4%. |

In some embodiments, the crystalline form of the compound of formula I disclosed herein is a crystalline form H having an X-ray powder diffraction pattern shown in FIG. 20.

The crystalline form H of the compound of formula I may be present in a non-solvate crystalline form or a solvate crystalline form, where the solvate refers to a solvate formed by an organic solvent and/or water and the corresponding compound.

In some embodiments, the present application provides a method for preparing the crystalline form H of the compound of formula I, comprising: mixing the compound of formula I with 4-methyl-2-pentanone, and separating a solid.

In the method described above, the volume/mass ratio of 4-methyl-2-pentanone to the compound of formula I is 5-200 mL/g; in some embodiments, the volume/mass ratio is 20-100 mL/g, preferably 50 mL/g.

In some embodiments, the method for preparing the crystalline form H of the compound of formula I disclosed herein comprises: mixing the compound of formula I with 4-methyl-2-pentanone, stirring the mixture at room temperature, filtering the resulting mixture to collect a precipitate, and drying the precipitate in vacuum to obtain the crystalline form H. In some embodiments, in the method described above, the drying in vacuum is performed at 50° C.

In another aspect, the present application provides a crystalline composition, wherein the crystalline form of the compound of formula I accounts for 50% or more, preferably 80% or more, more preferably 90% or more or most preferably 95% or more of the crystalline composition by weight. In a preferred embodiment, in the crystalline composition, the crystalline form of the compound of formula I is selected from the group consisting of: the crystalline form A, crystalline form B, crystalline form C, crystalline form D, crystalline form E, crystalline form F, crystalline form G or crystalline form H of the compound of formula I.

In another aspect, the present application provides a crystalline composition, wherein the crystalline form A, crystalline form B, crystalline form C, crystalline form D, crystalline form E, crystalline form F, crystalline form G or crystalline form H of the compound of formula I accounts for 50% or more, preferably 80% or more, more preferably 90% or more or most preferably 95% or more of the crystalline composition by weight.

In another aspect, the present application provides a pharmaceutical composition, comprising a therapeutically effective amount of the crystalline form of the compound of formula I or the crystalline composition thereof. In some embodiments, the pharmaceutical composition disclosed herein further comprises a pharmaceutically acceptable excipient.

In another aspect, the present application describes a method for treating a disease associated with anti-apoptotic protein BCL-2 in a mammal, comprising: administering to the mammal (preferably a human) in need a therapeutically effective amount of the crystalline form of the compound of formula I, the crystalline composition thereof or the pharmaceutical composition thereof described above.

In another aspect, the present application describes use of the crystalline form of the compound of formula I, the crystalline composition thereof or the pharmaceutical composition thereof described above, in preparing a medicament for preventing or treating a disease associated with anti-apoptotic protein BCL-2.

In another aspect, the present application describes use of the crystalline form of the compound of formula I, the crystalline composition thereof or the pharmaceutical composition thereof described above, in preventing or treating a disease associated with anti-apoptotic protein BCL-2.

In another aspect, the present application describes the crystalline form of the compound of formula I above, the crystalline composition thereof or the pharmaceutical composition thereof for use in preventing or treating a disease associated with anti-apoptotic protein BCL-2.

The disease associated with anti-apoptotic protein BCL-2 is selected from a cancer. The cancer is selected from acute lymphocytic leukemia.

The crystalline form of the compound of formula I includes the crystalline form A, the crystalline form B, the crystalline form C, the crystalline form D, the crystalline form E, the crystalline form F, the crystalline form G or the crystalline form H. For example, the crystalline form of the compound of formula I is selected from the group consisting of: the crystalline form A, crystalline form B, crystalline form C, crystalline form D, crystalline form E, crystalline form F, crystalline form G and crystalline form H of the compound of formula I.

X-ray powder diffraction (XRPD): Bruker D2 Phaser, equipped with a Cu target tube.

Thermogravimetric analysis (TGA): NETZSCH 209F3 TGA209F3A-0449-L; temperature range: 30-300° C.; scanning rate: 10° C./min.

Differential scanning calorimetry (DSC): TA DSC25; temperature range: 40-220° C.; scanning rate: 10° C./min.

Definitions and Description

Unless otherwise stated, the following terms and phrases used herein are intended to have the following meanings. A particular phrase or term, unless otherwise specifically defined, should not be considered as uncertain or unclear, but construed according to its common meaning. When referring to a trade name, it is intended to refer to its corresponding commercial product or its active ingredient.

It should be noted that in the X-ray powder diffraction pattern, the position and relative intensity of a peak may vary due to measuring instruments, measuring methods/conditions, and other factors. For any particular crystal form, the position of a peak may have an error, and the measurement of $2\theta$ may have an error of about $\pm 0.2°$. Therefore, this error should be considered when determining each crystal form, and crystal forms within this margin of error are within the scope of the present application.

It should be noted that, for the same crystal form, the position of an endothermic peak in the DSC (differential scanning calorimetry) pattern may vary due to measuring instruments, measuring methods/conditions, and other factors. For any specific crystal form, the position of an endothermic peak may have an error of about $\pm 5°$ C. or about $\pm 3°$ C. Therefore, this error should be considered when determining each crystal form, and crystal forms within this margin of error are within the scope of the present application.

The word "comprise" and variations thereof such as "comprises" or "comprising" will be understood in an open, non-exclusive sense, i.e., "including but not limited to".

The term "pharmaceutically acceptable excipient" refers to an inert substance administered with an active ingredient to facilitate administration of the active ingredient, including but not limited to, any glidant, sweetener, diluent, preservative, dye/coloring agent, flavor enhancer, surfactant, wetting agent, dispersant, disintegrant, suspending agent, stabilizer, isotonizing agent, solvent or emulsifier acceptable for use in humans or animals (e.g., domesticated animals) as permitted by the National Medical Products Administration, PRC. Non-limiting examples of the excipients include calcium carbonate, calcium phosphate, various sugars and types of starch, cellulose derivatives, gelatin, vegetable oils, and polyethylene glycols.

The term "pharmaceutical composition" refers to a mixture consisting of one or more of the compounds or the salts thereof disclosed herein and a pharmaceutically acceptable excipient. The pharmaceutical composition is intended to facilitate the administration of the compound to an organic entity.

The pharmaceutical composition disclosed herein can be prepared by combining the compound disclosed herein with a suitable pharmaceutically acceptable excipient, and can be formulated, for example, into a solid, semisolid, liquid, or gaseous formulation such as tablet, pill, capsule, powder, granule, ointment, emulsion, suspension, suppository, injection, inhalant, gel, microsphere and aerosol.

Typical routes of administration of the crystalline form, the crystalline composition or the pharmaceutical composition thereof disclosed herein include, but are not limited to, oral, rectal, topical, inhalational, parenteral, sublingual, intravaginal, intranasal, intraocular, intraperitoneal, intramuscular, subcutaneous and intravenous administrations.

The pharmaceutical composition disclosed herein can be manufactured using methods well known in the art, such as conventional mixing, dissolving, granulating, dragee-making, levigating, emulsifying, and lyophilizing.

In some embodiments, the pharmaceutical composition is in an oral form. For oral administration, the pharmaceutical composition can be formulated by mixing the active compounds with pharmaceutically acceptable excipients well known in the art. These excipients enable the compound disclosed herein to be formulated into tablets, pills, pastilles, dragees, capsules, liquids, gels, slurries, suspensions, etc. for oral administration to a patient.

Therapeutic dosages of the compounds disclosed herein may be determined by, for example, the specific use of a treatment, the route of administration of the compound, the health and condition of a patient, and the judgment of a prescribing physician. The proportion or concentration of the compound disclosed herein in a pharmaceutical composition may not be constant and depends on a variety of factors including dosages, chemical properties (e.g., hydrophobicity), and routes of administration.

The term "treating" or "treatment" means administering the compound or formulation described herein to ameliorate or eliminate a disease or one or more symptoms associated with the disease, and includes:
(i) inhibiting a disease or disease state, i.e., arresting its progression; and
(ii) alleviating a disease or disease state, i.e., causing its regression.

The term "prevent" or "prevention" means administering the compound, the composition or the formulation described herein to prevent a disease or one or more symptoms associated with the disease, and includes: preventing the occurrence of the disease or disease state in a mammal, particularly when such a mammal is predisposed to the disease state but has not yet been diagnosed with it.

For drugs and pharmacological active agents, the term "therapeutically effective amount" refers to an amount of a drug or a medicament that is sufficient to provide the desired effect and is non-toxic. The determination of the effective amount varies from person to person. It depends on the age and general condition of a subject, as well as the particular active substance used. The appropriate effective amount in a case may be determined by those skilled in the art in the light of conventional tests.

The therapeutically effective amount of the crystalline form disclosed herein is from about 0.0001 to 20 mg/kg body weight (bw)/day, for example from 0.001 to 10 mg/kg bw/day.

The dosage frequency of the crystalline form disclosed herein depends on needs of an individual patient, e.g., once or twice daily or more times daily. Administration may be intermittent, for example, in a period of several days, the patient receives a daily dose of the crystalline form, and in a following period of several days or more days, the patient does not receive the daily dose of the crystalline form.

All patents, patent applications and other identified publications are explicitly incorporated herein by reference for the purpose of description and disclosure. These publications are provided solely because they were disclosed prior to the filing date of the present application. All statements as to the dates of these documents or description as to the contents of these documents are based on the information available to the applicant and do not constitute any admission as to the correctness of the dates or the content of these documents. Moreover, in any country or region, any reference to these publications herein is not to be construed as an admission that the publications form part of the commonly recognized knowledge in the art.

All solvents used in the present application are commercially available and can be used without further purification.

DETAILED DESCRIPTION

Figure 1:
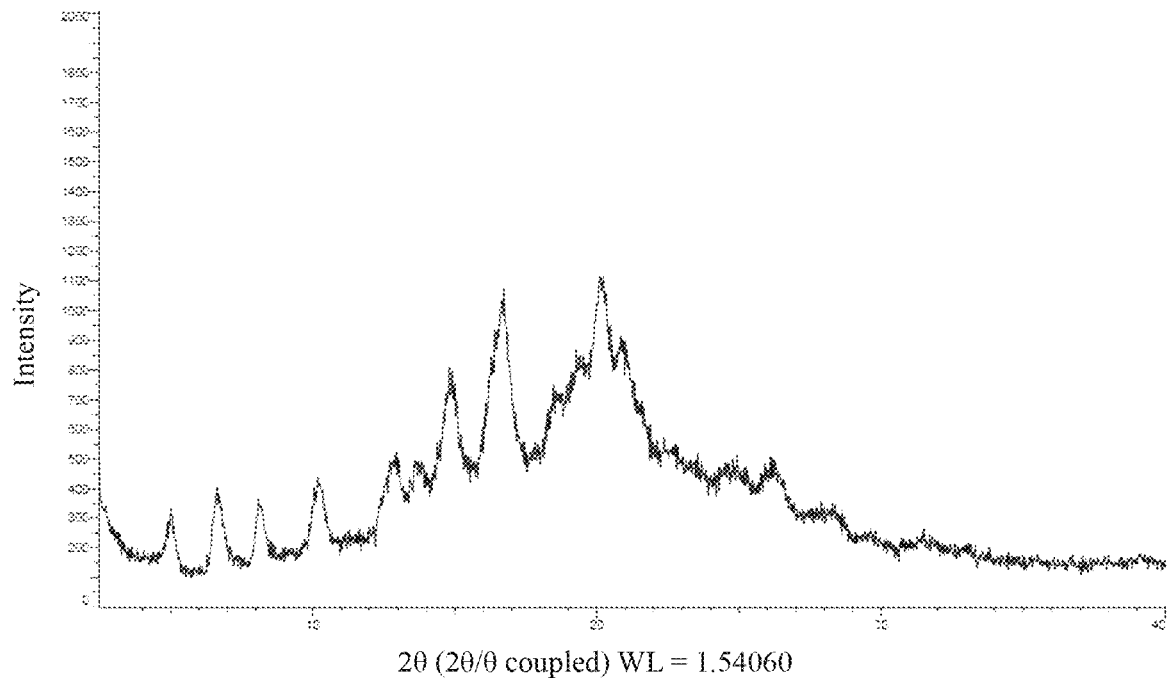
FIG. 1 shows an XRPD pattern of a crystalline form A of a compound of formula I.

The present application will be described in more detail below with reference to (but not limited to) the following examples and experiments.

The following abbreviations are used in the present application: Boc for tert-butyloxycarbonyl; THF for tetrahydrofuran; and TBSCl for tert-butyldimethylsilyl chloride.

Example 1: Preparation of Compound of Formula I

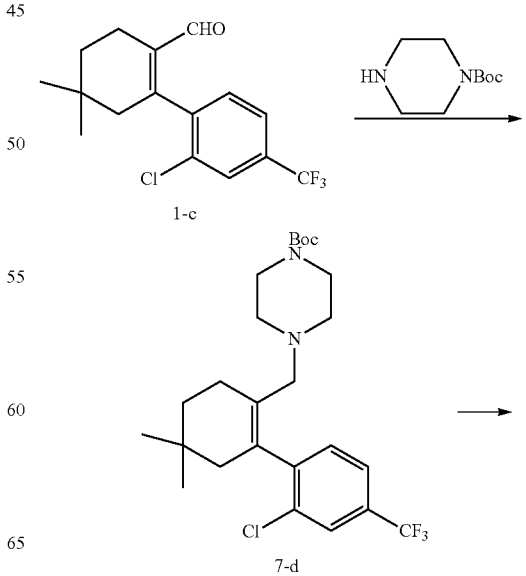

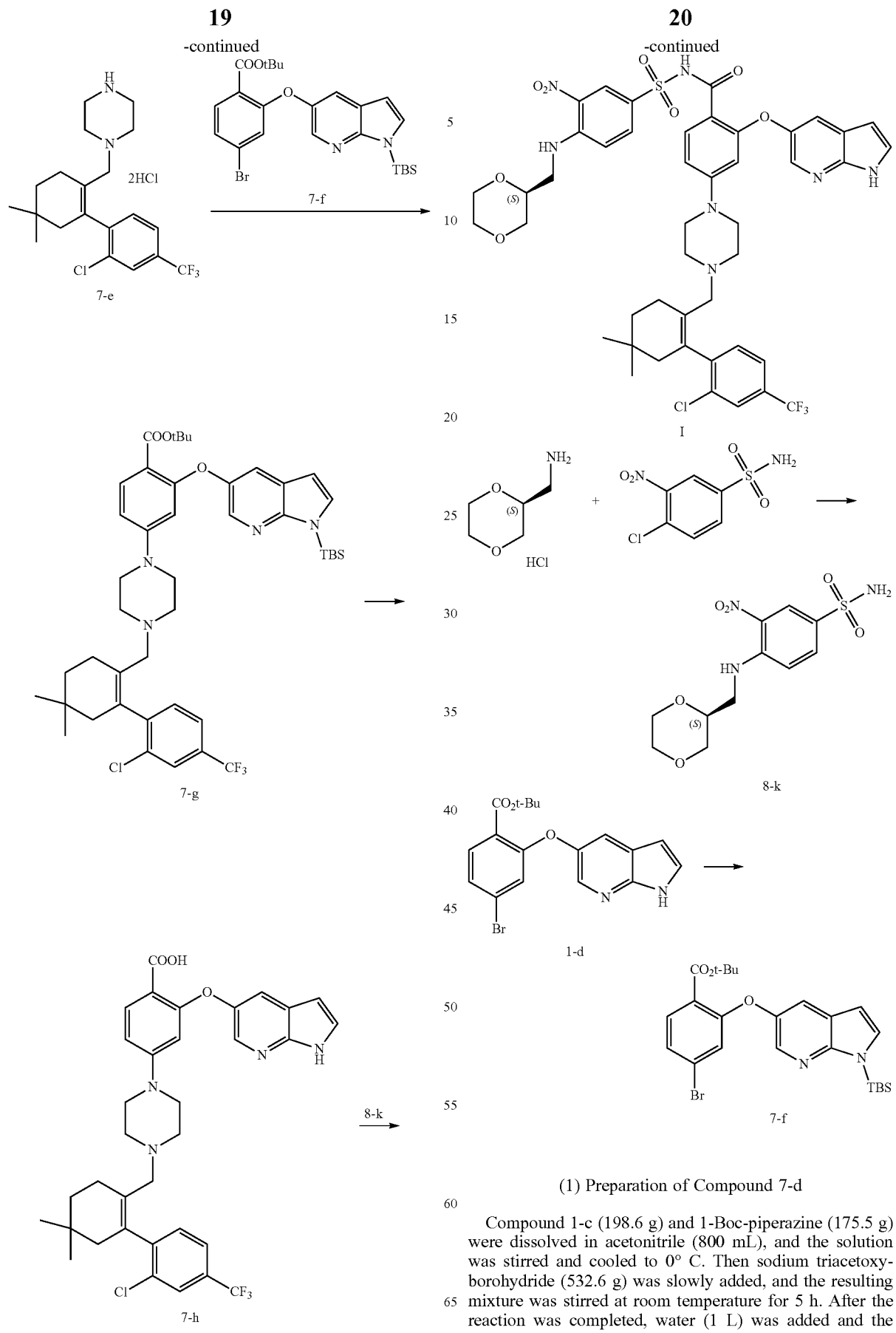

(1) Preparation of Compound 7-d

Compound 1-c (198.6 g) and 1-Boc-piperazine (175.5 g) were dissolved in acetonitrile (800 mL), and the solution was stirred and cooled to 0° C. Then sodium triacetoxyborohydride (532.6 g) was slowly added, and the resulting mixture was stirred at room temperature for 5 h. After the reaction was completed, water (1 L) was added and the resulting mixture was extracted with ethyl acetate (300 mL).

The organic phase was collected, dried over anhydrous Na$_2$SO$_4$, filtered and concentrated to give compound 7-d (269.8 g).

(2) Preparation of Compound 7-e

Compound 7-d (269.8 g), isopropanol (800 mL) and hydrochloric acid (36-38 wt %, 169 mL) were mixed, and the mixture was heated to 65° C. and reacted for 3 h. The reaction solution was cooled to precipitate a solid, and the solid was collected by filtration and dried to give compound 7-e (151.2 g).

Compounds 7-e: $^1$H NMR (500 MHz, DMSO-d6), δ: 7.82 (s, 1H), 7.68 (d, 1H), 7.36 (d, 1H), 7.10 (dd, 1H), 2.98 (s, 4H), 2.63 (d, 2H), 2.23 (m, 6H), 1.89 (m, 2H), 1.43 (s, 2H), 0.94 (s, 6H). $^{13}$C NMR (125 MHz, DMSO-d6), δ: 133.1, 132.6, 131.9, 130.9, 129.3, 128.6, 126.5, 125.7, 124.9, 124.6, 122.7, 60.2, 49.4, 44.7, 35.2, 29.4, 28.4, 27.1, 25.2, 21.4. ESI-MS: m/z=387.1 [M+H]$^+$.

(3) Preparation of Compound 7-g

NaH (21.1 g) was dissolved in THF (100 mL), and the solution was cooled to −20° C. and stirred for 10 min Tert-butyl 2-[(1H-pyrrolo[2,3-b]pyridin-5-yl)oxy]-4-bromobenzoate (compound 1-d, 128.3 g) was dissolved in THF (200 mL), and then was slowly added dropwise to the reaction solution, with the internal temperature maintained below 0° C. After the addition, the mixture was stirred for 30 min. The reaction solution was added dropwise with a solution of TBSCl (64.7 g) in THF (200 mL), with the internal temperature maintained at about −10° C., and reacted for 30 min after the addition. After the reaction was completed, the reaction solution was extracted with 500 mL of saturated sodium bicarbonate and ethyl acetate. The organic phase was collected, dried over anhydrous Na$_2$SO$_4$, filtered, concentrated and purified by column chromatography to give compound 7-f (150 g). ESI-MS: m/z=503.1 [M+H]$^+$.

Compound 7-e (151.2 tert-butyl 2-[(1-tert-butyldimethyl-silylpyrrolo[2,3-b]pyridin-5-yl)oxy]-4-bromobenzoate (compound 7-f, 197.1 tris(dibenzylideneacetone)dipalladium (2.7 [(4-(N,N-dimethylamino)phenyl]di-tert-butylphosphine (1.6 g), sodium tert-butoxide (187.4 g) and toluene (800 mL) were mixed, and the mixture was stirred, heated to 100° C. and reacted for 24 h in nitrogen atmosphere. After the reaction was completed, water (1 L) and ethyl acetate (300 mL) were added for extraction. The organic phase was collected, dried over anhydrous Na$_2$SO$_4$, filtered and concentrated to give compound 7-g (181.9 g).

Compound 7-g: $^1$H NMR (500 MHz, DMSO-d6), δ: 7.95 (s, 1H), 7.82 (s, 1H), 7.65 (t, 2H), 7.37 (m, 4H), 6.76 (d, 1H), 6.47 (s, 1H), 3.14 (s, 2H), 2.64 (d, 1H), 2.55 (d, 1H), 2.19 (m, 5H), 1.92 (m, 2H), 1.42 (t, 2H), 1.31 (t, 2H), 1.22 (m, 9H), 0.95 (d, 6H), 0.84 (s, 10H), 0.60 (s, 6H). $^{13}$C NMR (125 MHz, DMSO-d6), δ: 164.4 156.8, 155.1, 150.3, 149.8, 146.2, 133.6, 133.4, 133.2, 132.0, 131.9, 131.5, 129.5, 129.0, 128.8, 126.4, 126.1, 124.4, 122.8, 114.4, 113.8, 110.2, 106.8, 103.3, 80.1, 60.6, 52.6, 47.1, 44.7, 35.2, 29.4, 27.9, 27.2, 26.7, 25.4, 19.0. ESI-MS: m/z=809.4 [M+H]+.

(4) Preparation of Compound 7-h

A mixture of compound 7-g (181.9 g), toluene (1.8 L) and trifluoroacetic acid (107 mL) was heated to 45° C. and reacted for 5 h. The reaction solution was concentrated, and ethyl acetate (1.5 L) was added. The resulting mixture was washed with saturated aqueous NaHCO$_3$ solution and saturated aqueous sodium chloride solution, dried over anhydrous sodium sulfate, filtered and concentrated. Toluene (1 L) and ethyl acetate (200 mL) were added. The resulting mixture was heated until it was clarified, and was cooled to precipitate a solid. The solid was collected by filtration and dried to give compound 7-h (83.4 g).

Compound 7-h: $^1$H NMR (500 MHz, DMSO-d6), δ: 7.98 (s, 1H), 7.82 (s, 1H), 7.73 (d, 1H), 7.64 (d, 1H), 7.46 (s, 1H), 7.40 (s, 1H), 7.32 (d, 1H), 6.73 (d, 1H), 6.36 (d, 1H), 6.34 (s, 1H), 3.09 (s, 4H), 2.64 (d, 1H), 2.55 (d, 1H), 2.19 (m, 6H), 1.88 (m, 2H), 1.42 (m, 2H), 1.25 (m, 2H), 0.95 (m, 6H). $^{13}$C NMR (125 MHz, DMSO-d6), δ: 166.3, 158.9, 155.1, 148.9, 146.2, 145.3, 135.0, 133.8, 133.2, 132.0, 131.9, 131.4, 129.5, 129.2, 127.8, 126.4, 124.9, 124.4, 122.7, 120.2, 116.6, 112.0, 109.5, 105.3, 100.2, 60.5, 55.3, 52.7, 47.0, 44.7, 35.2, 29.4, 27.2, 25.4. ESI-MS: m/z=639.2 [M+H]+.

(5) Preparation of Compound 8-k

3-Nitro-4-chlorobenzenesulfonamide (35.0 g), (S)-2-(aminomethyl)-1,4-dioxane hydrochloride (30.0 g) and N,N-diisopropylethylamine (94.0 g) were dissolved in acetonitrile (400 mL), and the solution was heated to 85° C. and reacted for 5 h. The reaction solution was cooled at room temperature, left to stand overnight, and filtered in vacuum to give compound 8-k (46.5 g). ESI-MS: m/z=316.1 [M−H]$^-$.

(6) Preparation of Compound of Formula I

Compound 7-h (10 g) and dichloromethane (100 mL) were mixed, and the mixture was stirred at room temperature. Then 4-dimethylaminopyridine (2.8 and 1-ethyl-(3-dimethylaminopropyl)carbodiimine hydrochloride (4.4 g) were added and dissolved with stirring. The resulting mixture was added with compound 8-k (5.0 g) and triethylamine (4.5 g), and reacted at room temperature for 3 h. The reaction solution was washed successively with 5 wt % hydrochloric acid, saturated aqueous sodium bicarbonate solution and saturated aqueous sodium chloride solution, dried over anhydrous Na$_2$SO$_4$, filtered, concentrated, and purified by column chromatography to give an amorphous form of the compound of formula I (8.9 g).

Compound of formula I: $^1$H NMR (500 MHz, DMSO-d6), δ: 11.66 (s, 1H), 11.37 (s, 1H), 8.59 (t, 1H), 8.57 (d, 1H), 8.04 (d, 1H), 7.89 (d, 1H), 7.84 (dd, 1H), 7.70 (d, 1H), 7.54 (d, 1H), 7.52 (m, 2H), 7.40 (m, 1H), 7.11 (d, 1H), 6.75 (dd, 1H), 6.40 (dd, 1H), 6.29 (d, 1H), 3.79 (m, 3H), 3.65 (m, 2H), 3.51 (m, 2H), 3.42 (m, 2H), 3.03 (m, 4H), 2.67 (d, 1H), 2.54 (d, 1H), 2.17 (m, 6H), 1.88 (dd, 2H), 1.42 (t, 2H), 0.96 (s, 6H). $^{13}$C NMR (125 MHz, DMSO-d6), δ: 164.0, 158.2, 154.0, 147.9, 146.9, 145.9, 144.3, 135.6, 134.3, 132.9, 132.6, 131.8, 130.2, 130.0, 128.3, 128.2, 127.0, 125.2, 125.0, 122.8, 120.3, 118.3, 115.7, 114.1, 109.7, 103.6, 100.4, 73.4, 68.5, 66.4, 66.2, 58.6, 45.1, 44.4, 43.9, 34.6, 29.3, 29.1, 27.2, 24.8. ESI-MS: m/z=939.4 [M+H]$^+$.

Figure 2:
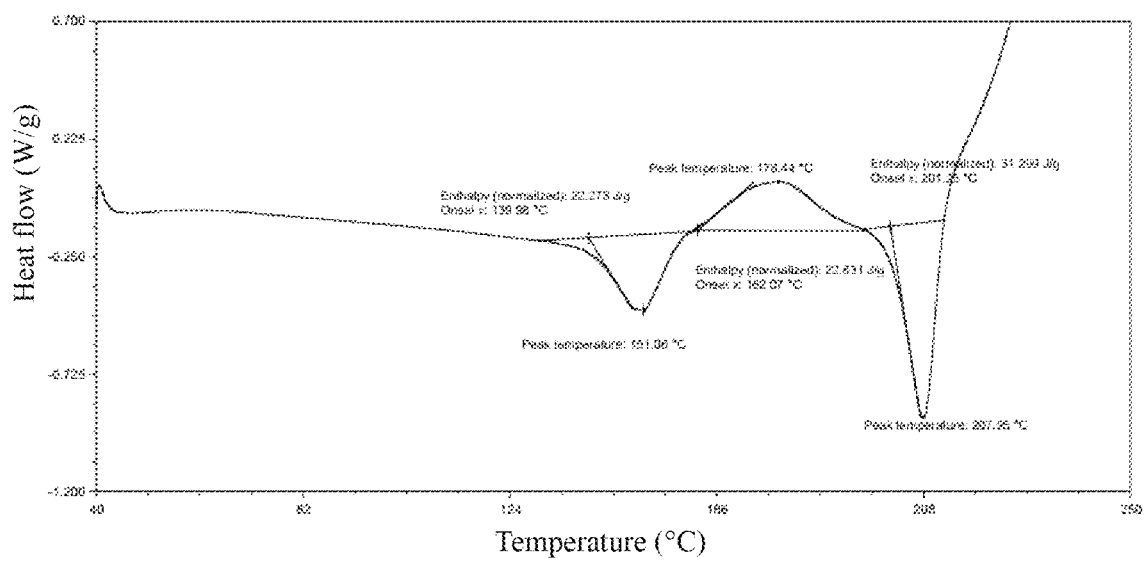
FIG. 2 shows a DSC pattern of the crystalline form A of the compound of formula I.
Figure 3:
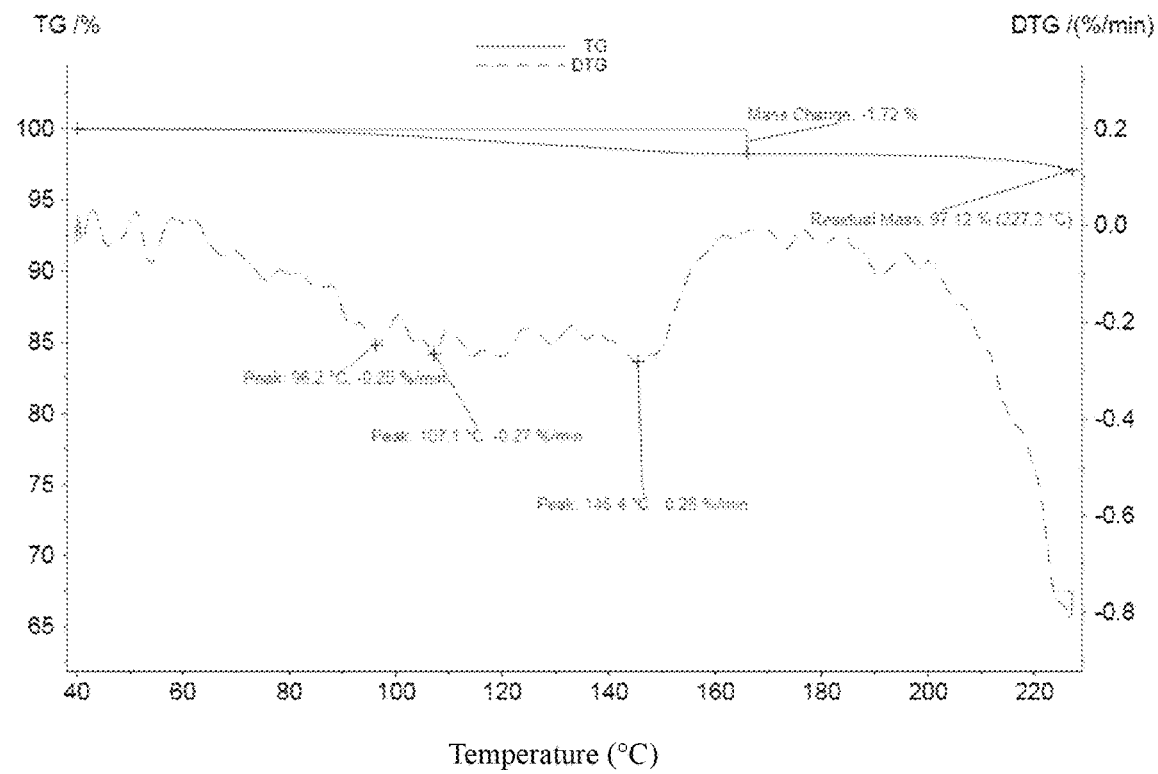
FIG. 3 shows a TG pattern of the crystalline form A of the compound of formula I.

Example 2: Preparation of Crystalline Form A of Compound of Formula I 5 g of the compound of formula I prepared in Example 1 was dissolved in 300 mL of mixed solution of dichloromethane and methanol (dichloromethane:methanol=20:1 or 100:1, V:V), and the solution was stirred for dissolution and clarification and concentrated at reduced pressure to obtain the crystalline form A. The XRPD pattern of the crystalline form A is shown in FIG. 1, the DSC pattern is shown in FIG. 2, and the TG pattern is shown in FIG. 3.

Example 3: Preparation of Crystalline Form B of Compound of Formula I

Figure 4:
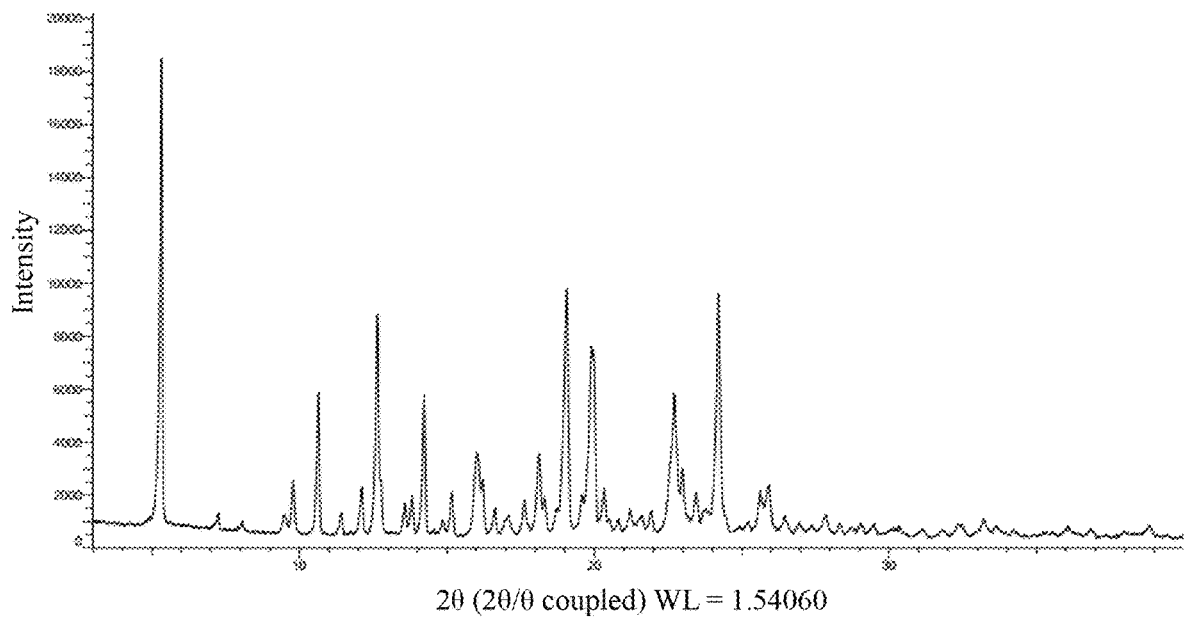
FIG. 4 shows an XRPD pattern of a crystalline form B of the compound of formula I.
Figure 5:
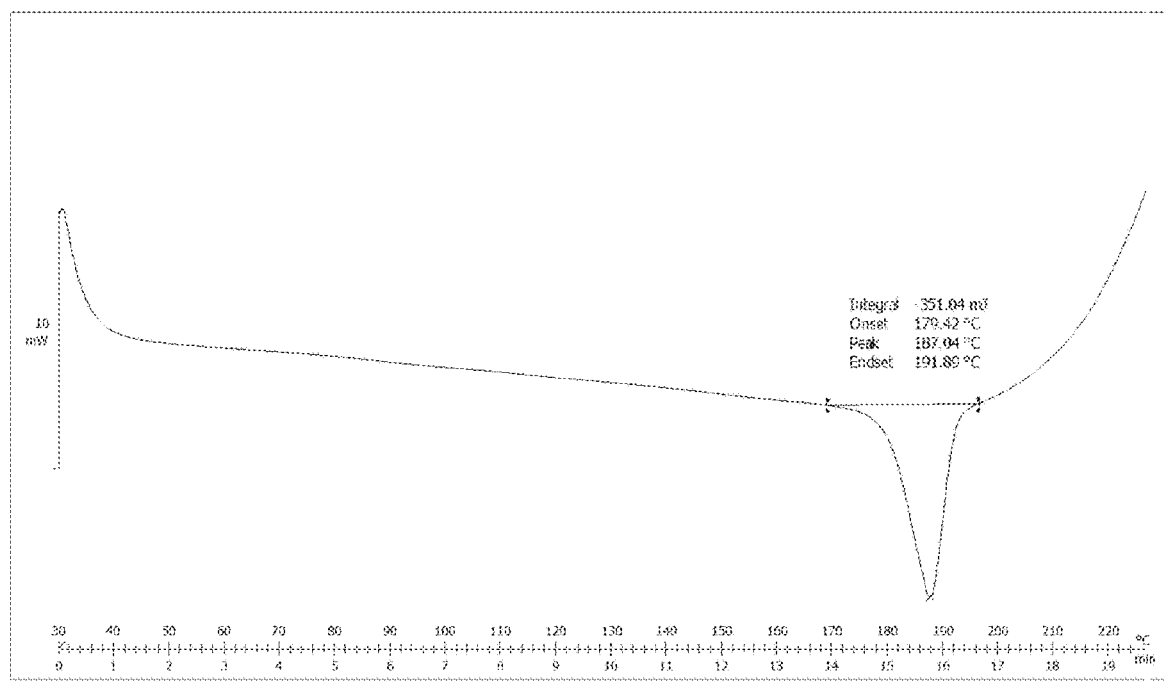
FIG. 5 shows a DSC pattern of the crystalline form B of the compound of formula I.
Figure 6:
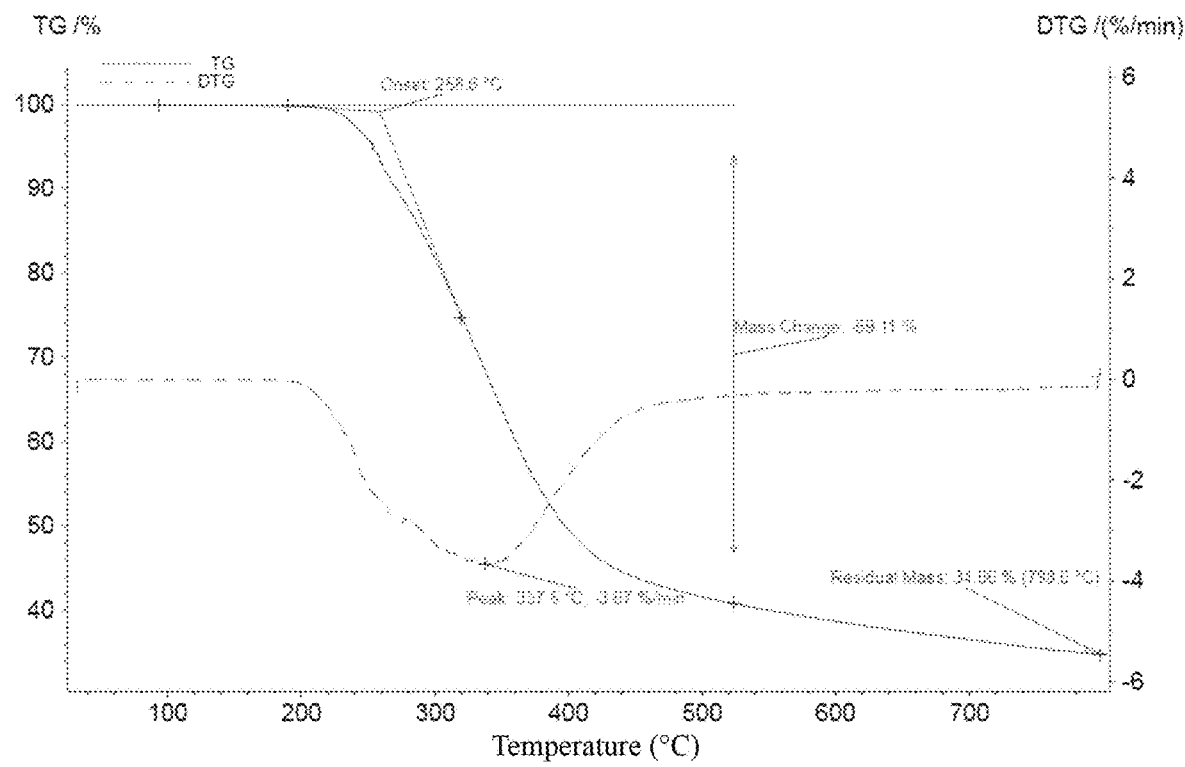
FIG. 6 shows a TG pattern of the crystalline form B of the compound of formula I.

About 200 mg of crystalline form A of the compound of formula I was transferred into a 4-mL glass flask and 2 mL of acetone was added. The resulting suspension was placed at room temperature, magnetically stirred for 5 h, and filtered to collect a precipitate. The precipitate was dried in vacuum at 40-60° C. for 24 h to obtain the crystalline form B of the compound of formula I. The XRPD pattern of the crystalline form B is shown in FIG. 4, the DSC pattern is shown in FIG. 5, and the TG pattern is shown in FIG. 6.

Example 4: Preparation of Crystalline Form C of Compound of Formula I

Figure 7:
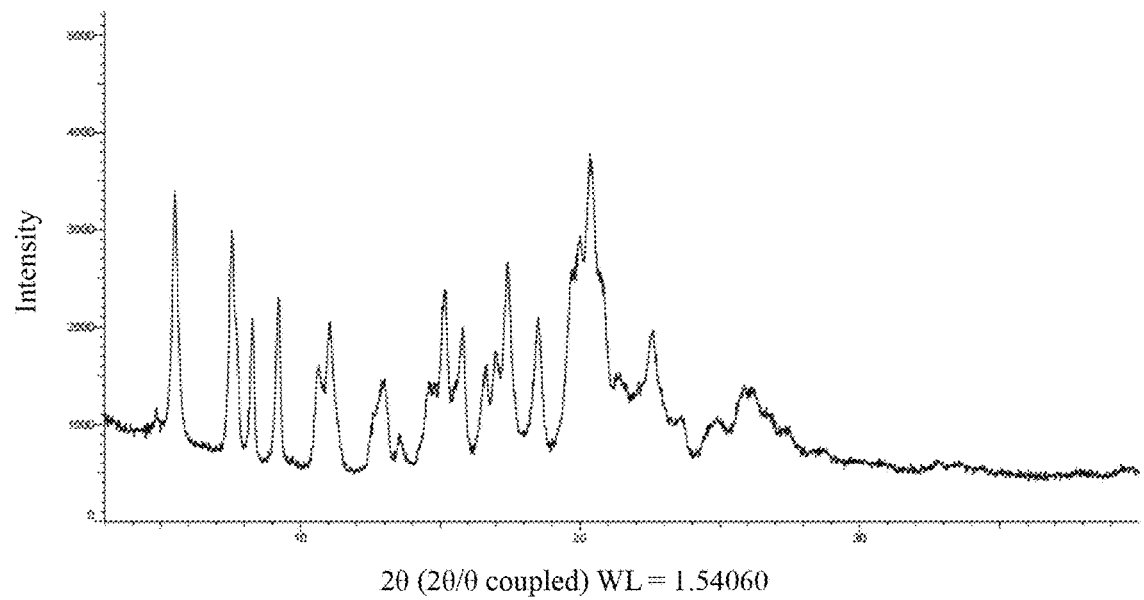
FIG. 7 shows an XRPD pattern of a crystalline form C of the compound of formula I.
Figure 8:
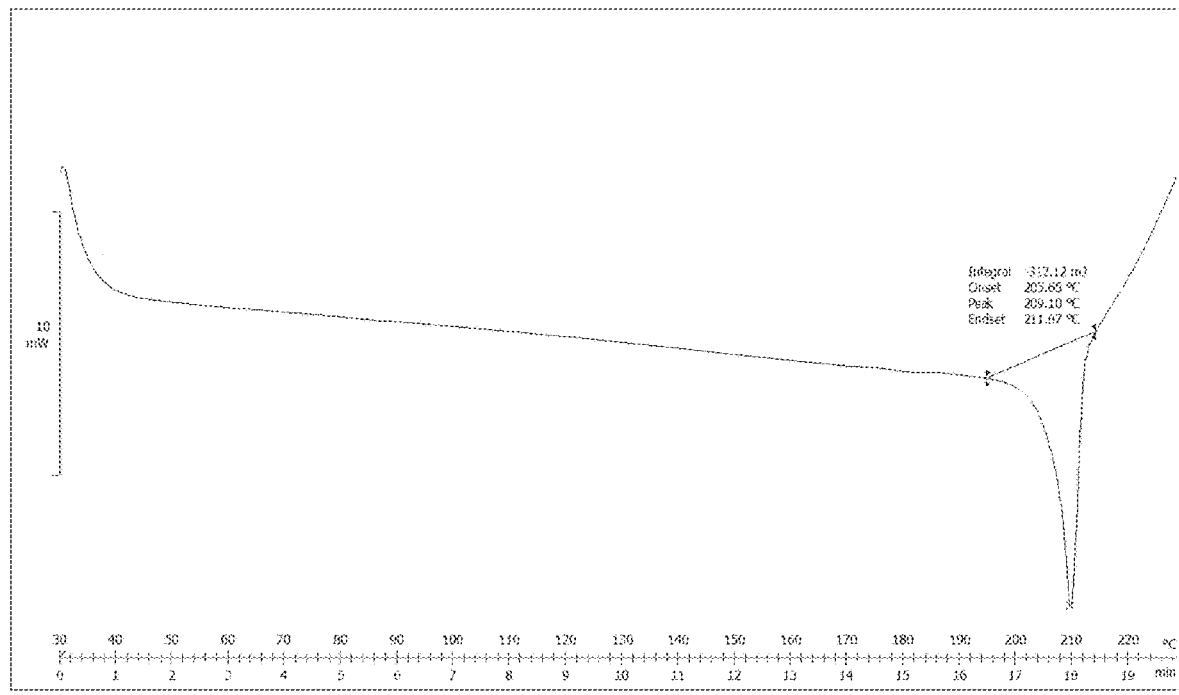
FIG. 8 shows a DSC pattern of the crystalline form C of the compound of formula I.
Figure 9:
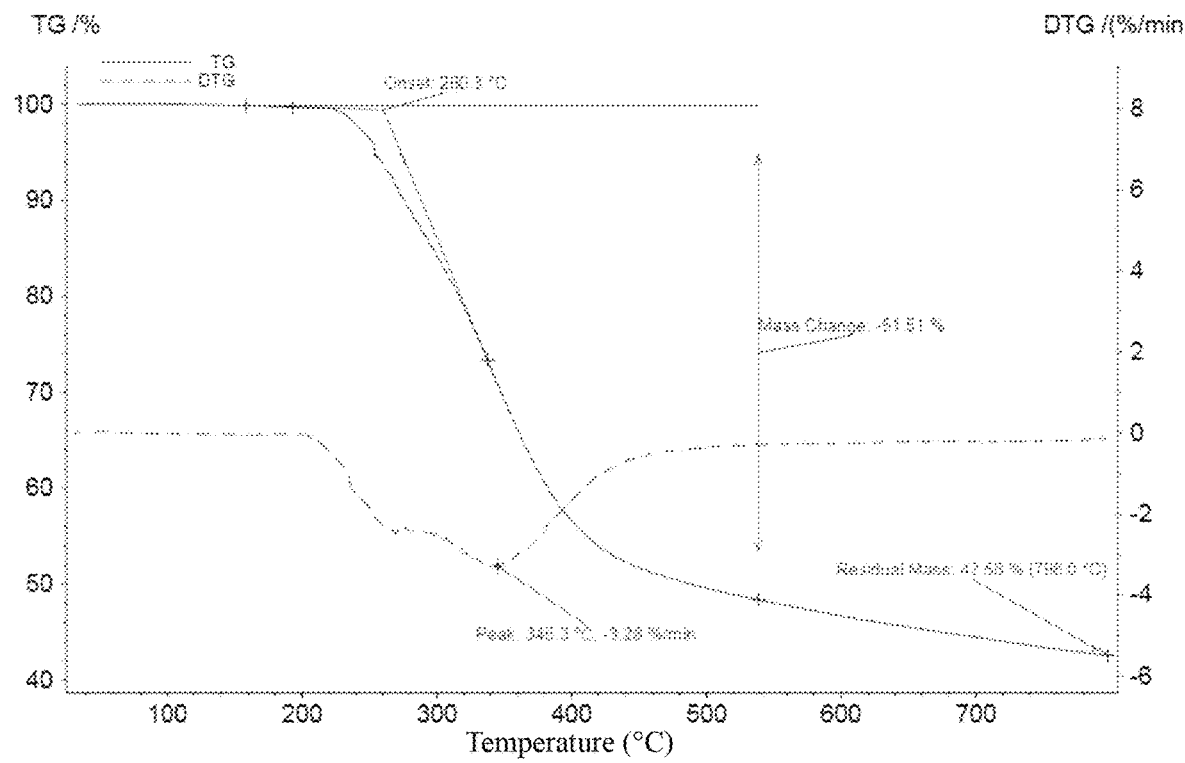
FIG. 9 shows a TG pattern of the crystalline form C of the compound of formula I.

About 4 g of crystalline form A of the compound of formula I was transferred into a 500-mL reaction flask, and 100 mL of methanol and 100 mL of methyl tert-butyl ether were added. The resulting suspension was placed at room temperature, magnetically stirred for 12 h, and filtered to collect a precipitate. The precipitate was dried in vacuum at 40-60° C. for 24 h to obtain the crystalline form C of the compound of formula I. The XRPD pattern of the crystalline form C is shown in FIG. 7, the DSC pattern is shown in FIG. 8, and the TG pattern is shown in FIG. 9.

Example 5: Preparation of Crystalline Form D of Compound of Formula I (1) About 3 g of crystalline form A of the compound of formula I was transferred into a 500-mL reaction flask, and 200 mL of a mixed tetrahydrofuran-water solvent (tetrahydrofuran:water=10:1-0.5:1) was added. The resulting suspension was placed at room temperature, magnetically stirred for 12 h, and filtered to collect a precipitate. The precipitate was dried by air blasting at 40-60° C. to obtain the crystalline form D of the compound of formula I.
(2) About 3 g of crystalline form A of the compound of formula I was transferred into a 250-mL reaction flask, and 100 mL of isopropanol or 1,4-dioxane was added. The resulting suspension was placed at room temperature, magnetically stirred for 12 h, and filtered to collect a precipitate. The precipitate was dried by air blasting at 40-60° C. to obtain the crystalline form D of the compound of formula I.
(3) About 0.7 g of crystalline form A of the compound of formula I was transferred into a 100-mL reaction flask, and 35 mL of tetrahydrofuran was added. The mixture was magnetically stirred at room temperature to dissolve completely. The resulting solution was filtered to obtain a supernatant, and the supernatant was transferred into a 40-mL clean glass flask. The glass flask with the supernatant was sealed with a sealing film on which several small holes were made, and the supernatant was left to stand at room temperature to slowly evaporate the solvent. After the solvent was evaporated completely, a solid was collected to obtain the crystalline form D of the compound of formula I.

Figure 10:
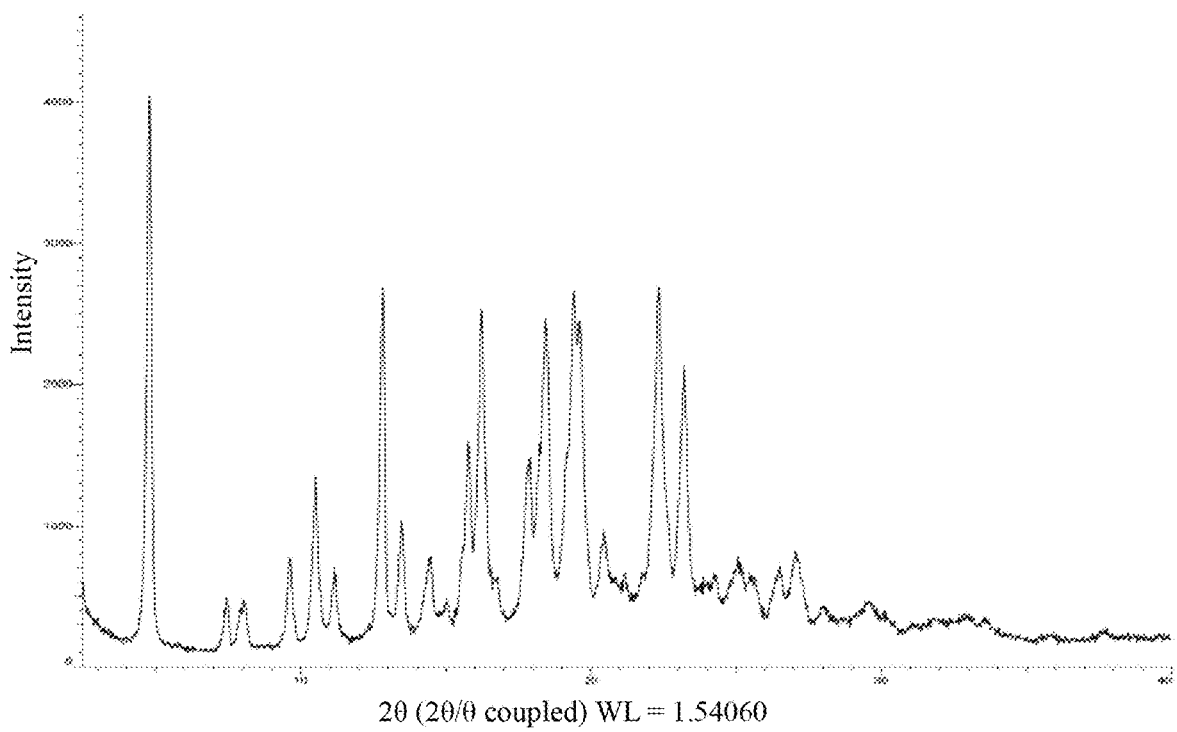
FIG. 10 shows an XRPD pattern of a crystalline form D of the compound of formula I.
Figure 11:
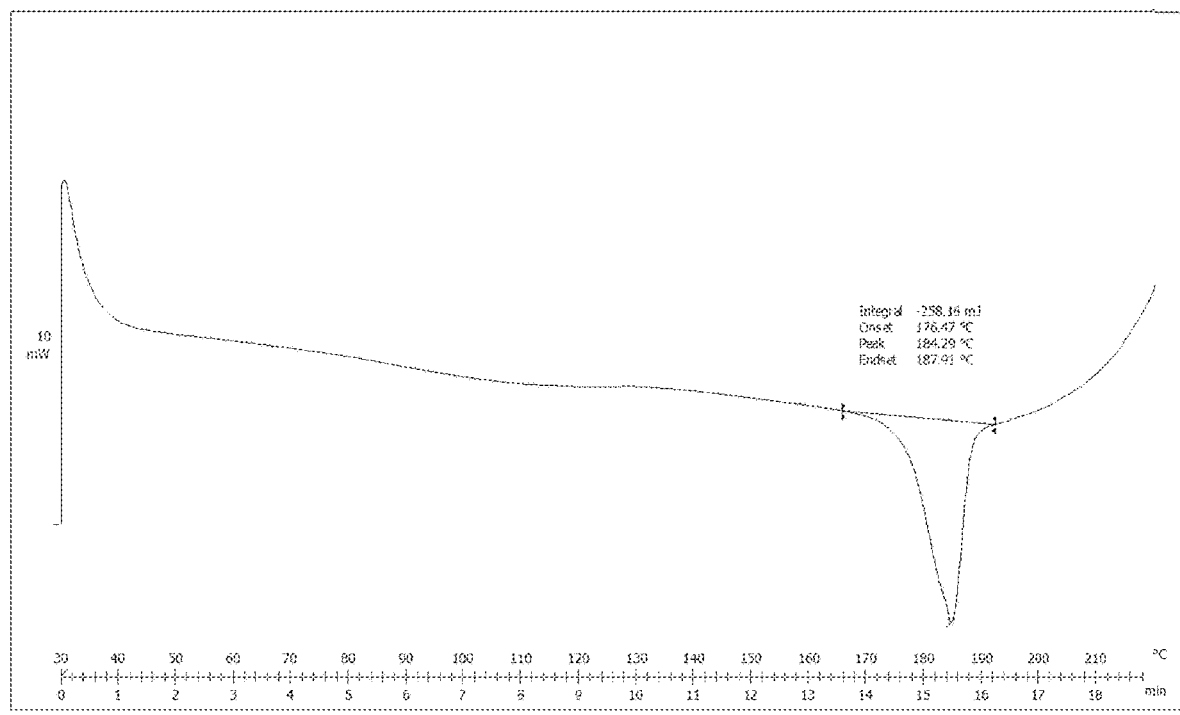
FIG. 11 shows a DSC pattern of the crystalline form D of the compound of formula I.
Figure 12:
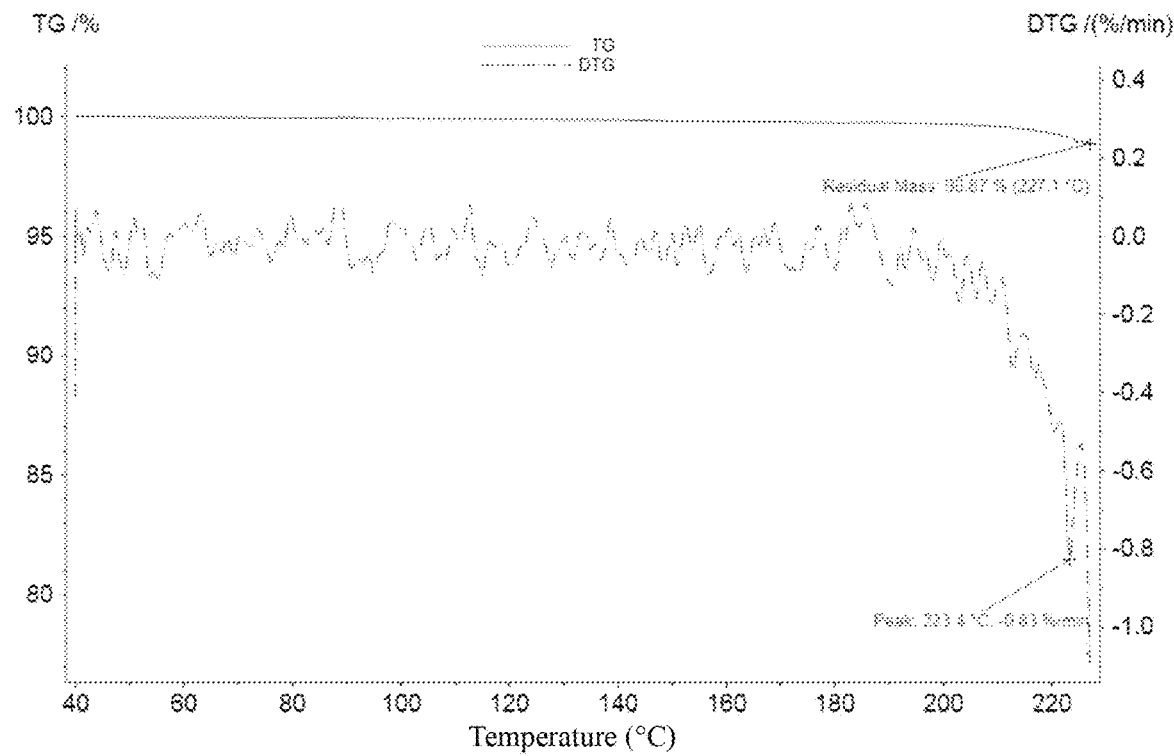
FIG. 12 shows a TG pattern of the crystalline form D of the compound of formula I.

The XRPD pattern of the crystalline form D is shown in FIG. 10, the DSC pattern is shown in FIG. 11, and the TG pattern is shown in FIG. 12.

Example 6: Preparation of Crystalline Form E of Compound of Formula I

Figure 13:
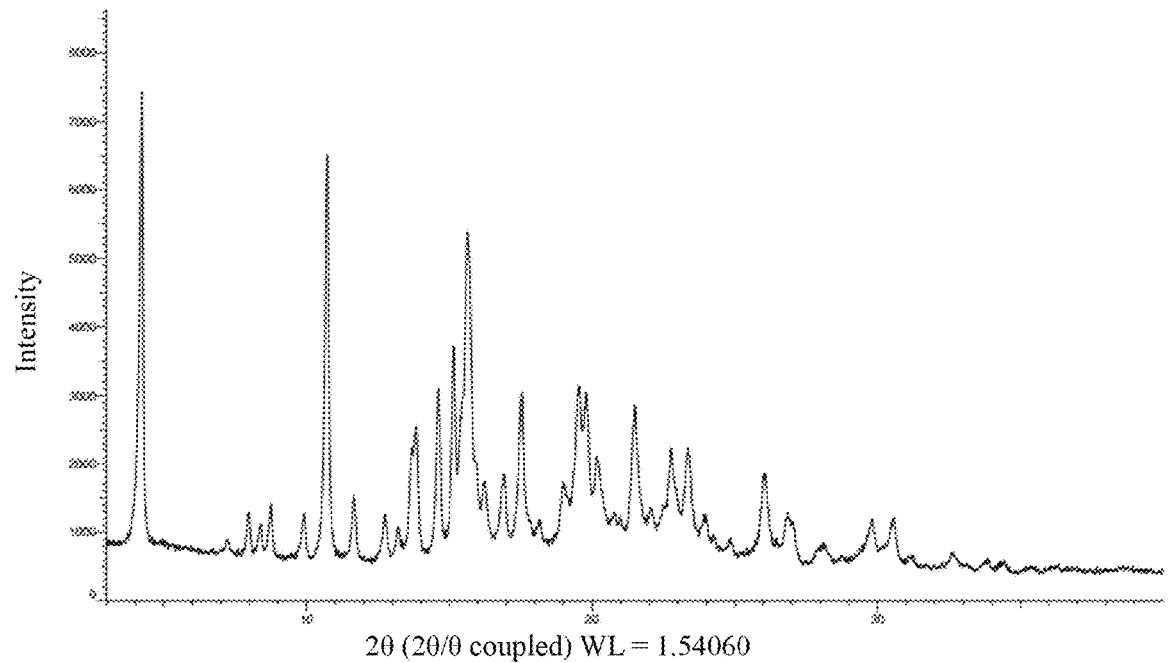
FIG. 13 shows an XRPD pattern of a crystalline form E of the compound of formula I.
Figure 14:
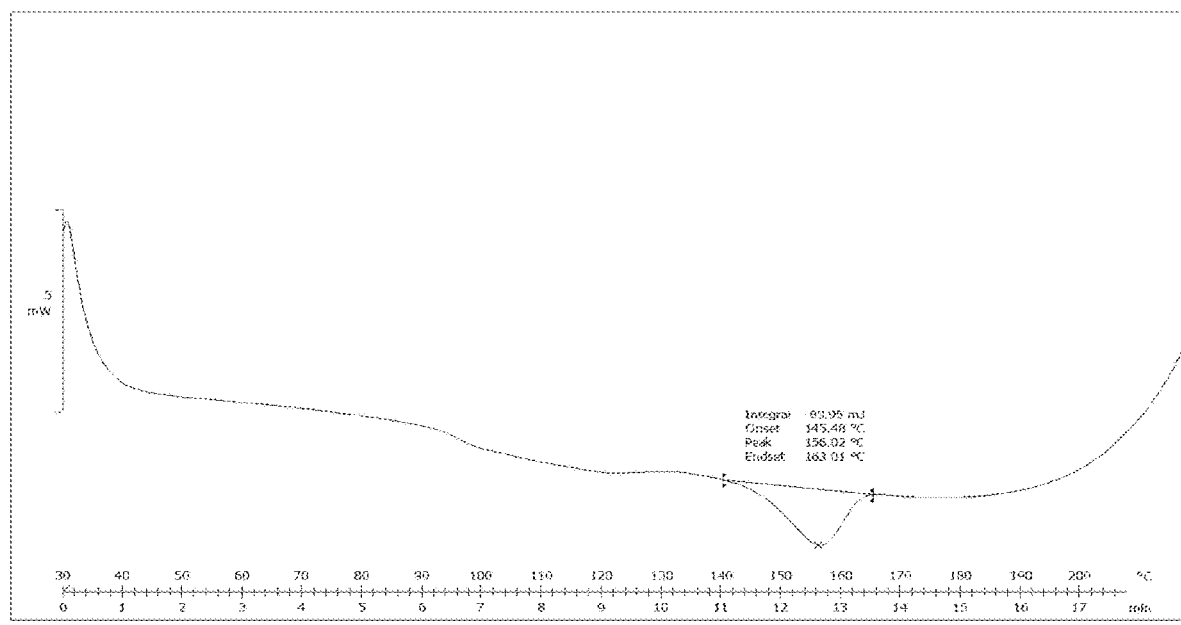
FIG. 14 shows a DSC pattern of the crystalline form E of the compound of formula I.
Figure 15:
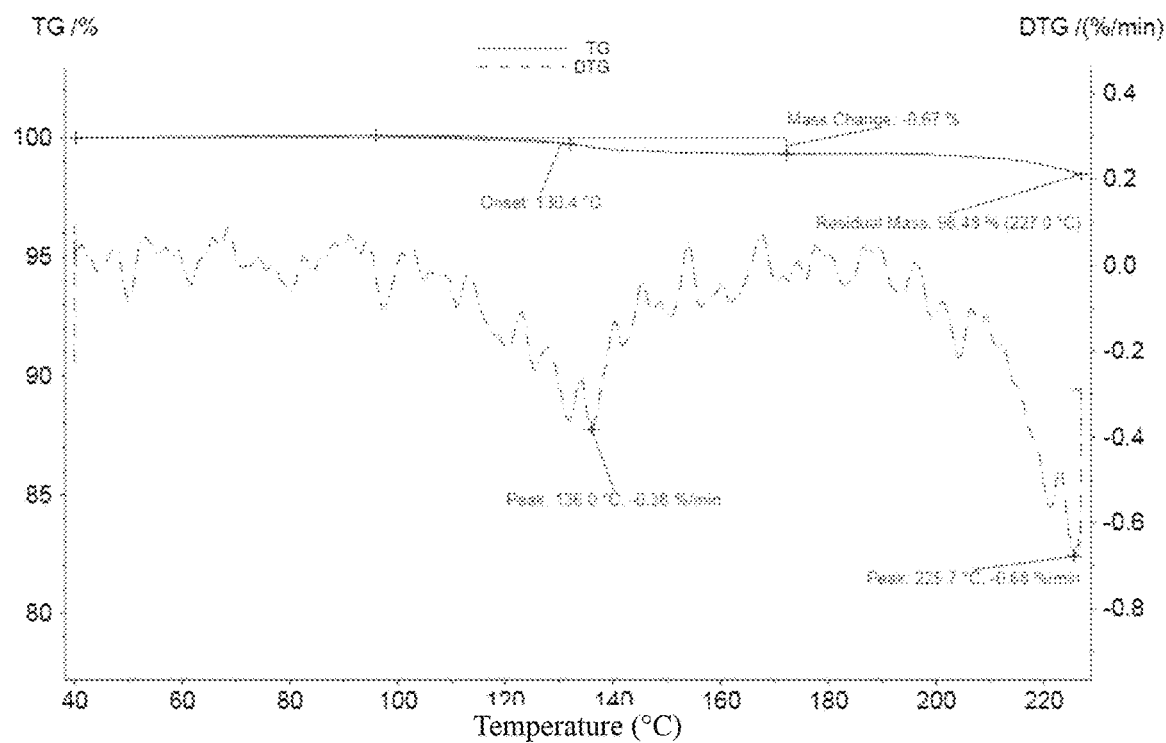
FIG. 15 shows a TG pattern of the crystalline form E of the compound of formula I.

About 20 g of crystalline form A of the compound of formula I was transferred into a 1-L reaction flask, and 400 mL of p-xylene was added. The resulting suspension was placed at room temperature, magnetically stirred for 5 h, and filtered to collect a precipitate. The precipitate was dried in vacuum at 80-100° C. for 5-10 h to obtain the crystalline form E of the compound of formula I. The XRPD pattern of the crystalline form E is shown in FIG. 13, the DSC pattern is shown in FIG. 14, and the TG pattern is shown in FIG. 15.

Example 7: Preparation of Crystalline Form F of Compound of Formula I

Figure 16:
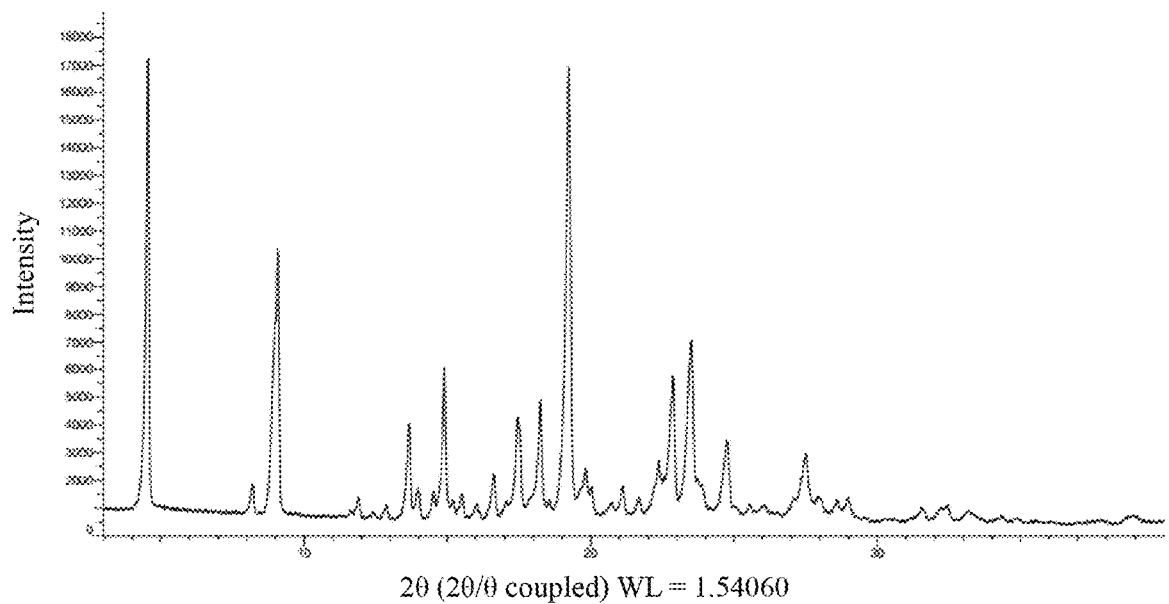
FIG. 16 shows an XRPD pattern of a crystalline form F of the compound of formula I.
Figure 17:
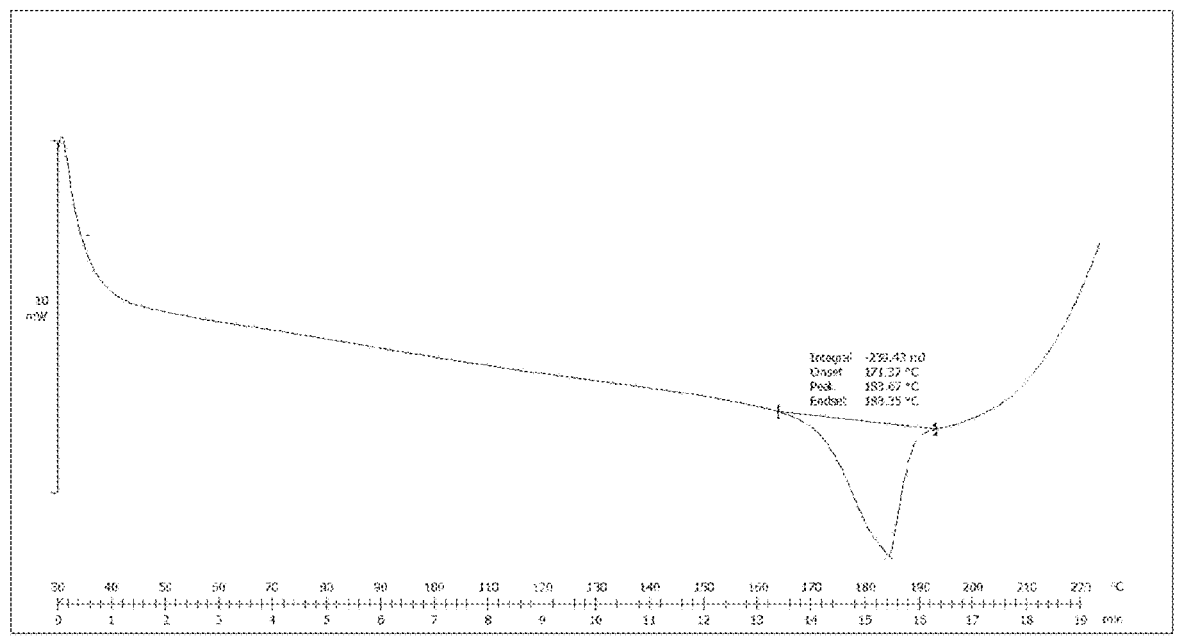
FIG. 17 shows a DSC pattern of the crystalline form F of the compound of formula I.
Figure 18:
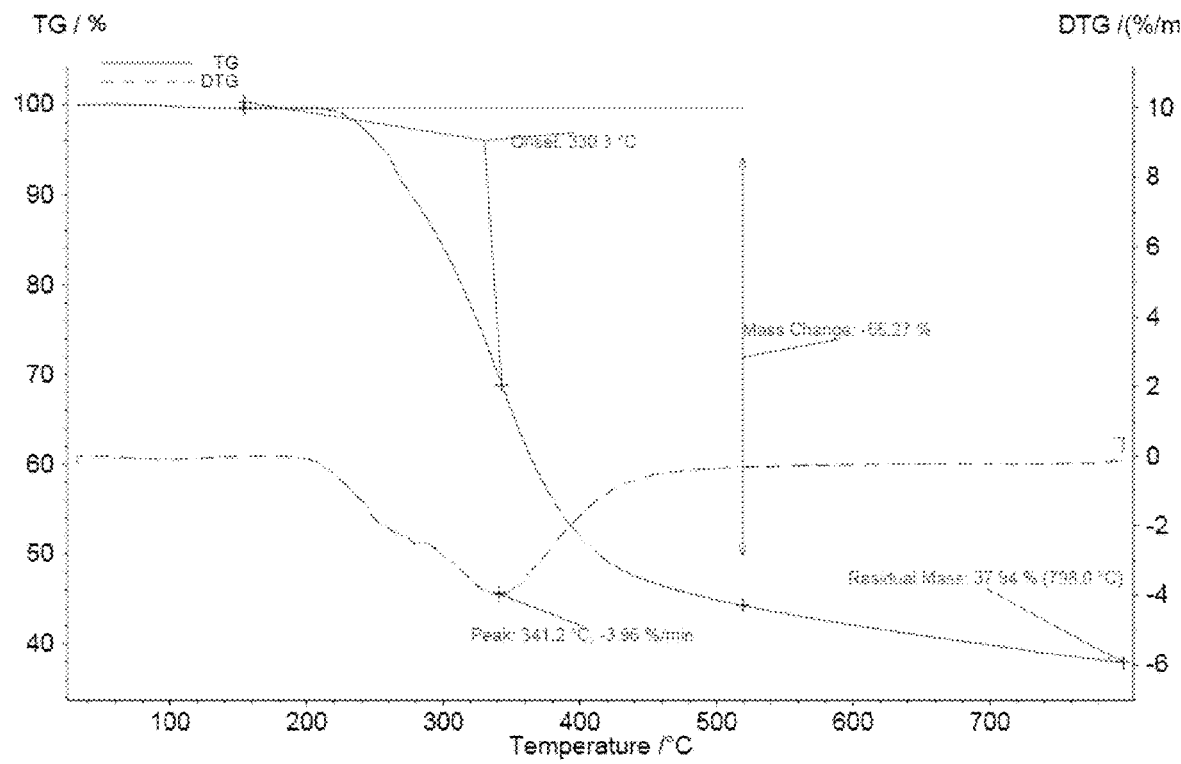
FIG. 18 shows a TG pattern of the crystalline form F of the compound of formula I.

About 4 g of crystalline form A of the compound of formula I was transferred into a 500-mL reaction flask, and 200 mL of acetonitrile or nitromethane was added. The resulting suspension was placed at room temperature, magnetically stirred for 12 h, and filtered to collect a precipitate. The precipitate was dried in vacuum at 40-60° C. to obtain the crystalline form F of the compound of formula I. The XRPD pattern of the crystalline form F is shown in FIG. 16, the DSC pattern is shown in FIG. 17, and the TG pattern is shown in FIG. 18.

Example 8: Preparation of Crystalline Form G of Compound of Formula I

Figure 19:
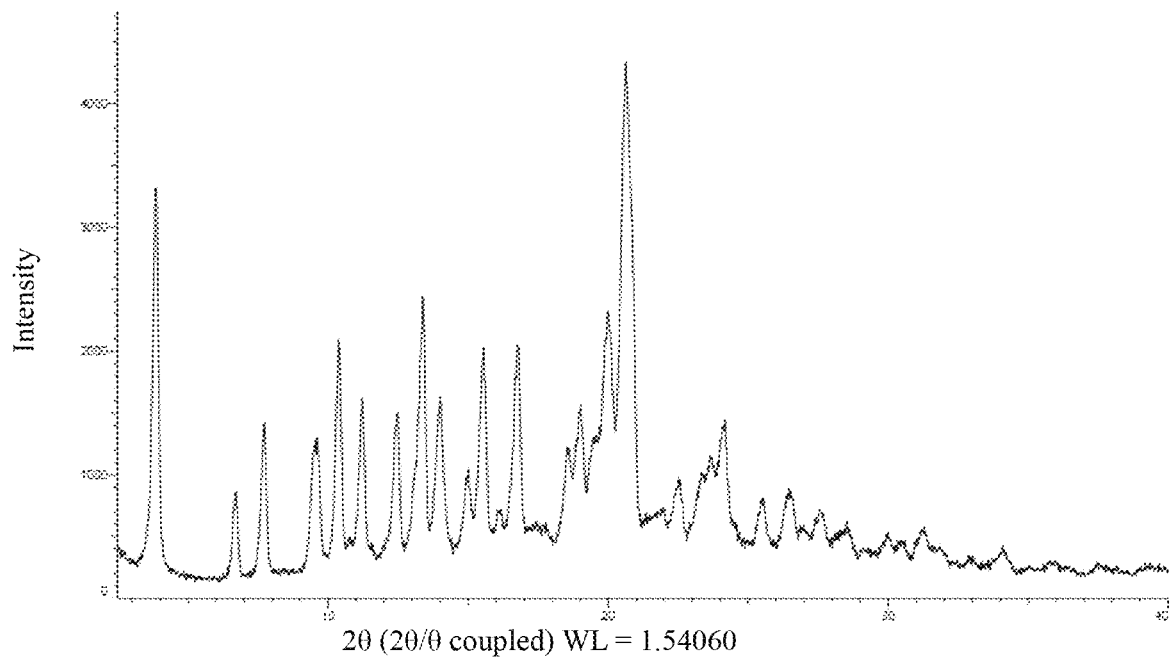
FIG. 19 shows an XRPD pattern of a crystalline form G of the compound of formula I.

About 4 g of crystalline form A of the compound of formula I was transferred into a 500-mL reaction flask, and 375 mL of p-xylene was added. The resulting suspension was placed at room temperature, magnetically stirred for 5 h, and filtered to collect a precipitate to obtain the crystalline form G of the compound of formula I. The XRPD pattern of the crystalline form G is shown in FIG. 19.

Example 9: Preparation of Crystalline Form H of Compound of Formula I

Figure 20:
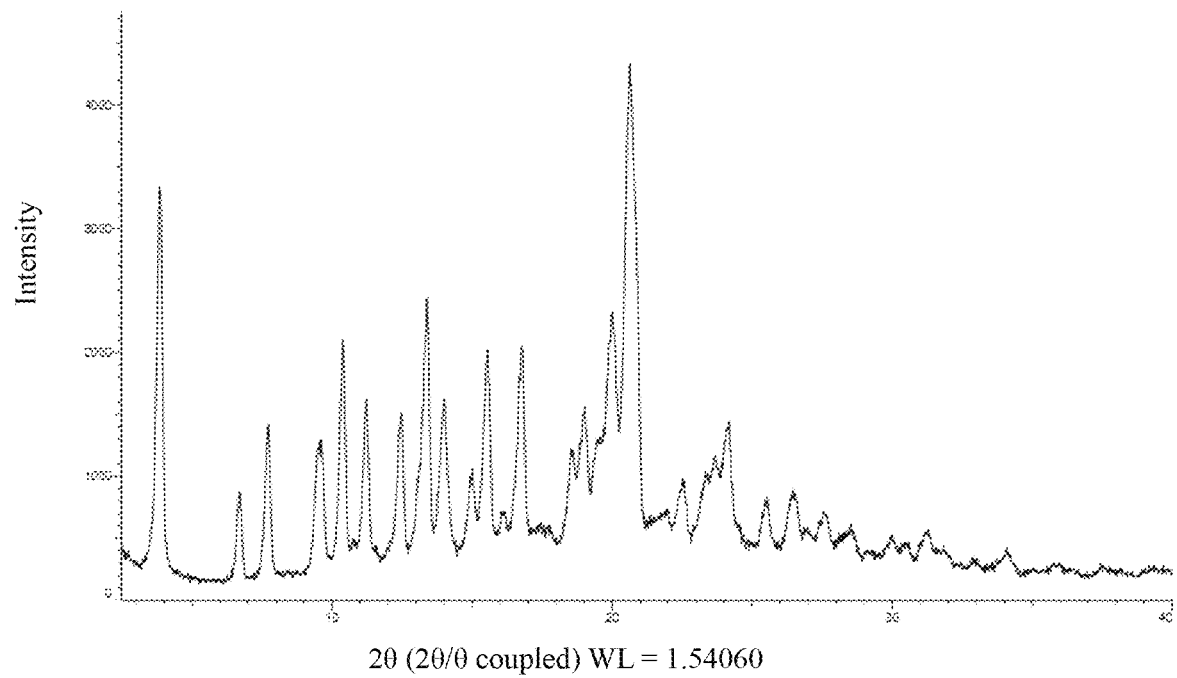
FIG. 20 shows an XRPD pattern of a crystalline form H of the compound of formula I.

About 4 g of crystalline form A of the compound of formula I was transferred into a 500-mL reaction flask, and 200 mL of 4-methyl-2-pentanone was added. The resulting suspension was placed at room temperature, magnetically stirred for 12 h, and filtered to collect a precipitate. The precipitate was dried in vacuum at 50° C. for 2 h to obtain the crystalline form H of the compound of formula I. The XRPD pattern of the crystalline form H is shown in FIG. 20.

Example 10: Stability Test of Crystalline Forms

Test samples were put into an open and proper clean container, and left to stand at 60° C. for 10 days. Samples were collected on day 5 and day 10;

Test samples were put into a closed humid container, and left to stand at 92.5%±5% RH/25° C. for 10 days. Samples were collected on day 5 and day 10;

Test samples were put into a lighting box or other suitable lighting devices (open) with fluorescent lamps at 4500 1x±500 1x for 10 days. Samples were collected on day 5 and day 10.

In the three conditions, the purity of the product and the contents of related substances were detected after the test samples were placed in the experimental conditions.
    Instrument: Thermo U3000 high-performance liquid chromatography;
    Detector: thermo VWD-3100 UV absorption detector/DAD-3000 diode array detector;
    Chromatographic column: XSelect CSH C18 (4.6×150 mm, 3.5 μm);

Injection volume: 10 µL; detection wavelength: 280 nm; flow rate: 1.0 mL/min; column temperature: 30° C.;
Mobile phase: phase A: 0.1% of aqueous formic acid solution, phase B: acetonitrile, gradient elution;
Preparation of sample solution: An appropriate amount of the product was precisely, and dissolved in methanol. The solution was quantitatively diluted to obtain a solution containing about 0.5 mg per 1 mL as a test solution.
The results are shown in Table 9 below.

TABLE 9

| Crystalline form | Retention time | High temperature 60° C. | | High humidity 92.5 ± 5% RH/25° C. | | Irradiation 4500 ± 500 lx | |
|---|---|---|---|---|---|---|---|
| | | Purity | Crystalline form | Purity | Crystalline form | Purity | Crystalline form |
| Amorphous form | Day 0 | 97.91% | Amorphous form | 97.91% | Amorphous form | 97.91% | Amorphous form |
| | Day 5 | 97.51% | Amorphous form | 97.85% | Amorphous form | 95.96% | Amorphous form |
| | Day 10 | 97.33% | Amorphous form | 97.89% | Amorphous form | 93.83% | Amorphous form |
| Crystalline form A | Day 0 | 97.92% | A | 97.92% | A | 97.92% | A |
| | Day 5 | 97.41% | A | 97.84% | A | 97.07% | A |
| | Day 10 | 97.17% | A | 97.91% | A | 96.62% | A |
| Crystalline form B | Day 0 | 98.44% | B | 98.44% | B | 98.44% | B |
| | Day 5 | 98.34% | B | 98.45% | B | 98.22% | B |
| | Day 10 | 98.22% | B | 98.36% | B | 97.68% | B |
| Crystalline form C | Day 0 | 98.56% | C | 98.56% | C | 98.56% | C |
| | Day 5 | 98.25% | C | 98.70% | C | 98.45% | C |
| | Day 10 | 97.31% | C | 98.64% | C | 98.15% | C |
| Crystalline form E | Day 0 | 98.02% | E | 98.02% | E | 98.02% | E |
| | Day 10 | 97.88% | E | 97.89% | E | 97.71% | E |

Example 11: Hygroscopicity Test

For the method and conditions of the hygroscopicity test, please refer to the "Guidelines for the Hygroscopicity Test of Drugs" (General Chapter 9103, Chinese Pharmacopoeia, Volume IV, 2015 Edition). Hygroscopicity refers to the capability or degree of a substance for absorbing water in certain temperature and humidity conditions. The test samples were solid drug substances meeting the specifications, and the test results may be used as a reference for selection of suitable drug packaging and storage conditions.

(1) A dried glass weighing bottle with a plug (outer diameter: 50 mm; height: 15 mm) was taken and placed in a suitable thermostatic dryer (with saturated ammonium chloride or ammonium sulfate solution placed in the lower part) at 25° C.±1° C. or an artificial climate box (with a set temperature at 25° C.±1° C. and relative humidity at 80%±2%) on the day before the test, and the weight (m1) was precisely measured.

(2) An appropriate amount of test sample was taken and spread in the above weighing bottle, with the thickness of the test sample being about 1 mm in general, and the weight (m2) was precisely measured.

(3) The weighing bottle was opened and placed in the above conditions at constant temperature and humidity for 24 h together with the cap.

(4) The weighing bottle was capped, and the weight (m3) was precisely measured.

The results are shown in Table 10.

$$\text{Weight gain \%} = \frac{m_3 - m_2}{m_2 - m_1} \times 100\%$$

TABLE 10

| Crystalline form | Hygroscopic weight gain |
|---|---|
| Crystalline form A | 1.38 wt % |
| B | 0.30 wt % |
| C | 0.11 wt % |
| D | 0.75 wt % |
| Crystalline form E | 0.11 wt % |

TABLE 10-continued

| Crystalline form | Hygroscopic weight gain |
|---|---|
| Crystalline form F | 0.76 wt % |
| Crystalline form H | 0.25 wt % |

Experimental Example 1: Inhibitory Activity for In Vitro Protein Binding 1.1 Screening on Inhibitory Activity for BCL-2/BAK Binding 500 nM Tag1-BCL-2 protein stock solution and 20 µM Tag2-BAK protein stock solution were diluted to 5 nM and 120 nM respectively with dilution buffer in kit (model: BCL-2/BAK (BH3) BINDING ASSAY KITS, from Cisbio). 5 µL of Tag1-BCL-2 protein diluent was added to each well, then the compound of formula I dissolved in DMSO were added to the wells with a nanoliter pipettor, allowing the final compound concentrations to be 200 nM to 0.0488 nM (4-fold gradient for 7 concentrations in total). Blank control wells (without enzyme) and negative control wells (with enzyme, plus vehicle DMSO) were set, and the samples were tested in duplicate. Finally, 5 µL of Tag2-BAK protein diluent was added to each well, and the mixture was mixed well by centrifugation and incubated at 25° C. for 15 min. 100× anti-Tag1-Eu$^{3+}$ and 100× anti-Tag2-XL665 were both diluted to 1× working concentration with the detection buffer in the kit. Anti-Tag1-Eu$^{3+}$ and anti-Tag2-XL665 were mixed well in a 1:1 ratio, and the mixture was added to wells at 5 µL/well, and incubated at 25° C. for 2 h or more. The plate was read using a PE Envision multi-functional microplate reader (excitation: 620 nm, emission: 665 nm) and IC$_{50}$ (shown in Table 11) was calculated by four-parameter fitting.

1.2 Screening on Inhibitory Activity for BCL-XL/BAK Binding 300 nM Tag1-BCL-XL protein stock solution and 10 µM Tag2-BAK protein stock solution were diluted to 2 nM and 80 nM respectively with dilution buffer in kit (model: BCL-XL/BAK (BH3) BINDING ASSAY KITS, from Cisbio). 5 µL of Tag1-BCL-XL protein diluent was added to each well, then the compound of formula I dissolved with DMSO were added to the wells with a nanoliter pipettor, allowing the final compound concentrations to be 2000 nM to 0.488 nM (4-fold gradient for 7 concentrations in total). Blank control wells (without enzyme) and negative control wells (with enzyme, plus vehicle DMSO) were set, and the samples were tested in duplicate. Finally, 5 µL of Tag2-BAK protein diluent was added to each well, and the mixture was mixed well by centrifugation and incubated at 25° C. for 15 min. 100× anti-Tag1-Eu$^{3+}$ and 100× anti-Tag2-XL665 were both diluted to 1× working concentration with the detection buffer in the kit. Anti-Tag1-Eu$^{3+}$ and anti-Tag2-XL665 were mixed well in a 1:1 ratio, and the mixture was added to wells at 5 µL/well, and incubated at 25° C. for 2 h or more. The plate was read using a PE Envision multi-functional microplate reader (excitation: 620 nm, emission: 665 nm) and IC$_{50}$ (shown in Table 11) was calculated by four-parameter fitting.

TABLE 11

Inhibition of BCL-2/BAK and BCL-XL/BAK binding activity by compound of Formula I

| Compound | BCL-2/BAK IC$_{50}$(nM) | BCL-XL/BAK |
|---|---|---|
| Compound of formula I | 2.8 | 155 |

Experimental Example 2: Inhibitory Effect of the Compound on Proliferation of RS4;11 Cells RS4;11 cells (from Nanjing Cobioer) in logarithmic growth phase and good cell condition were added to a centrifuge tube and centrifuged at 1500 rpm for 3 min in a low speed benchtop centrifuge. The supernatant was discarded, and 5 mL of complete medium (RPMI basic medium+10 wt % fetal bovine serum (PBS)) was added using a pipette for cell resuspension. The cells were counted using a cell counter, diluted with complete medium to a cell density of 2×10$^5$ cells/mL, and an equivalent amount of RPMI basic medium was added to adjust the serum concentration to 5% and the cell density to 1×10$^5$ cells/mL for plate seeding. The cells were seeded on a 96-well plate at 100 µL/well using a multi-channel pipette and cultured in a cell incubator at 37° C., 5% CO$_2$ and saturated humidity. After 24 h of incubation, the compound was loaded using a nanoliter pipettor in duplicate for each concentration, and cells without the compound were used as the negative control. After 72 h, CCK-8 reagent was added at 10 µL/well for incubation for 4 h, then absorbance was measured at 450 nm with an Envision plate reader, and inhibition rate was calculated. Inhibition rate (%)=(mean value of negative control group−mean value of experimental group)/(mean value of negative control group−mean value of blank group)×100%. A dose-response curve was fitted by four-parameter analysis, with the logarithm of compound concentration serving as abscissa and inhibition rate serving as ordinate, and the IC$_{50}$ was calculated (Table 12).

TABLE 12

Inhibitory effect of the compound on proliferation of RS4;11 cells

| Compound | RS4;11 cells IC$_{50}$ (nM) |
|---|---|
| Compound of formula I | 2.5 |

Experimental Example 3: In Vitro Stability in Liver Microsome

300 µL of the final incubation system contains 30 µL of liver microsomes (protein concentration: 5 mg/mL), 30 µL of NADPH+MgCl$_2$, 3 µL of the test compound (in acetonitrile), and 237 µL of PBS buffer (pH 7.4). Among them, the proportion of the organic solvent (acetonitrile) was 1% (volume ratio). Samples were prepared in duplicate for each species (mouse, rat and human), with 0.3 mL each. Tubes each containing 270 µL of a mixed solution of substrate and enzyme and NADPH were pre-incubated at 37° C. for 5 min 30 µL of NADPH+MgCl$_2$ was added and the mixture was mixed. 50 µL of the mixture was taken at 0 min, 15 min, 30 min and 60 min, and 300 µL of glacial acetonitrile containing an internal standard was added to terminate the reaction. 50 µL of the incubated sample was added with 300 µL of glacial acetonitrile containing an internal standard (20 ng/mL diazepam) for precipitation. The mixture was vortexed for 5 min, and centrifuged (13,000 rpm, 20° C.) for 10 min 70 µL of supernatant was taken and 70 µL of ultrapure water was added for dilution and homogeneous mixing. 1 µL of sample was injected for analysis. The parameters for elimination of the compound in liver microsomes of humans, rats and mice are shown in Table 13.

TABLE 13

In vitro metabolic stability of compounds in liver microsomes (1 µM)

| Compound No. | Mouse Residuals at 60 min (%) | Rat Residuals at 60 min (%) | Human Residuals at 60 min (%) |
|---|---|---|---|
| Compound of formula I | 73.9% | 90.9% | 86.3% |

Experimental Example 4: In Vivo Pharmacokinetics

4.1 Pharmacokinetics in Rats

SD rats of 180-220 g were randomized into groups of 3 after 3-5 days of acclimatization, and intragastrically administered with a solution of the compound of formula I at a dose of 5 mg/kg.

The test animals (SD rats) were fasted for 12 h before administration and fed 4 h after administration, and were given free access to water before, after and during the study.

After intragastric administration, about 0.2 mL of blood was collected from the orbit at 0 min, 15 min, 30 min, 1 h, 2 h, 4 h, 6 h, 8 h, 10 h and 24 h. After anticoagulation with EDTA-K2, blood samples were transferred to a centrifuge within 30 min, and centrifuged at 4000 rpm for 10 min at 4° C. to separate the plasma. All the plasma samples were collected and immediately stored at −20° C. for testing.

300 µL of acetonitrile solution containing an internal standard (20 mg/mL diazepam) was added to 50 µL of the plasma sample. The mixture was shaken and mixed well for 5 min, and centrifuged at 13,000 rpm for 10 min. 75 µL of supernatant was taken and diluted with 75 μL of ultrapure water. After being mixed well, 2 μL of the resulting sample was subjected to LC/MS/MS, and a chromatogram was recorded.

Oral exposure of the compound disclosed herein was evaluated by in-vivo pharmacokinetic studies in rats. The pharmacokinetic parameters for the compound were fitted using DAS3.2.5 software. The data are shown in Table 14 below.

TABLE 14

Pharmacokinetic parameters for the compound

| PK parameters | Compound of formula I, IG, 5 mg/kg |
|---|---|
| $T_{max}$ (h) | 4.00 ± 0.00 |
| $C_{max}$ (ng/mL) | 739 ± 226 |
| AUC(0-24 h) (ng * h/mL) | 5973 ± 2021 |
| AUC(0-∞) (ng * h/mL) | 6558 ± 1805 |
| $t_{1/2}$(h) | 7.62 ± 2.78 |
| MRT(0-t) (h) | 7.35 ± 0.45 |

4.2 Pharmacokinetics in Beagle Dogs

After a period of time of acclimation, three male beagle dogs of 9-12 kg were intragastrically administer with a solution of the compound of formula I at a dose of 2.5 mg/kg.

The test animals (male beagle dogs) were fasted for 12 h before administration and fed 4 h after administration, and were given free access to water before, after and during the study.

After the intragastric administration, about 0.5 mL of blood was collected from the forelimb vein at 0.25 h (15 min), 0.5 h (30 min), 1 h, 1.5 h, 2 h, 4 h, 6 h, 8 h, 10 h, 24 h, 30 h, 48 h and 72 h into vacutainers with EDTA-K2 for anticoagulation, and centrifuged at 4° C., 4000 rpm for 10 min within 30 min to separate plasma. All the plasma samples were collected and immediately stored at −20° C. for testing.

300 μL of acetonitrile solution containing an internal standard (20 ng/mL diazepam) was added to 50 μL of the plasma sample. The mixture was shaken and mixed well for 5 min, and centrifuged at 13,000 rpm for 10 min. 75 μL of supernatant was taken and diluted with 75 μL of ultrapure water. After being mixed well, 1 μL of the resulting sample was subjected to LC/MS/MS, and a chromatogram was recorded.

Oral exposure of the compound disclosed herein was evaluated by in-vivo pharmacokinetic studies in beagle dogs. The pharmacokinetic parameters for the compounds fitted using DAS3.2.5 software are shown in Table 15 below.

TABLE 15

Pharmacokinetic parameters for the compound in beagle dogs

| Test compound Dosage | | Compound of formula I 2.5 mg/kg |
|---|---|---|
| T½ | (h) | 19.47 ± 1.64 |
| Tmax | (h) | 3.33 ± 1.16 |
| Cmax | (ng/mL) | 1429 ± 769 |
| AUC0-72 h | (h * ng/mL) | 26269 ± 13586 |
| AUC0-∞ | (h * ng/mL) | 27692 ± 14182 |
| MRTlast | (h) | 17.2 ± 1.62 |

Experimental Example 5: Pharmacodynamics of the Compound in Human B-Cell Leukemia RS4;11 Subcutaneous Xenograft Model NOD/SCID mice, female, aged 9-10 weeks (ages upon tumor cell grafting), body weight of 16.3-22.0 g. The mice were purchased from Beijing AniKeeper Biotech Co., Ltd. (production license number: SCXK (Jing) 2017-0006; animal certification number: 11402400013155). Breeding environment: SPF grade. Mice were grafted subcutaneously on the right anterior dorsal side with $1 \times 10^7$ RS4;11 cells. The day of grafting was defined as day 0. When the mean tumor volume was 240 mm³, the mice were randomized by the tumor size. The administration was performed as per Table 16 below.

TABLE 16

Administration route, dosage and regimen for human B-cell leukemia RS4;11 subcutaneous xenograft model

| Groups | n | Treatment group | Dose (mg/kg) | Mode of administration | Time of administration |
|---|---|---|---|---|---|
| 1 | 6 | Vehicle | | p.o. | Single dose |
| 2 | 6 | Compound of formula I (solution) | 25 | p.o. | Single dose |

Note:
n: the number of the animals; volume of administration: 10 μL/g.

Clinical symptoms observed during the study were recorded in the raw data. Calculation formula for tumor volume: Tumor volume (mm³)=½×(a×b²) (where a represents long diameter and b represents short diameter). The data were collected using StudyDirector™ software (version No. 3.1.399.19, supplier: Studylog System, Inc., S.San Francisco, CA, USA) in the study, including measurements of the long and short diameters of the tumor and body weights of the animals. The raw data obtained from a balance and a vernier caliper were directly input into the software, and any change in the data was recorded. Relative tumor proliferation rate (T/C %) refers to the percentage of the relative tumor volume or tumor weight of the treatment and control groups at a certain time point. The calculation formula is as follows:

T/C %=$T_{RTV}/C_{RTV}$×100%($T_{RTV}$:mean RTV for treatment group;$C_{RTV}$:mean RTV for vehicle control group;RTV=$V_t/V_0$, where $V_0$ denotes the tumor volume of the animal upon grouping, and $V_t$ denotes the tumor volume of the animal after treatment).

Tumor growth inhibition rate (TGI %) was calculated according to the following formula: TGI %=(1−T/C)×100%. (T and C are the relative tumor volume (RTV) or tumor weight (TW) at a particular time point for the treatment and control groups, respectively).

All experimental results were expressed as mean tumor volume±SEM (standard error of mean). The relative tumor volume of the treatment group was compared with that of the control group for any significant difference by the independent sample T test. All the data were analyzed using SPSS 18.0. p<0.05 was defined as a significant difference. The results are shown in Table 17.

TABLE 17

Pharmacodynamics for each group of human B-cell leukemia RS4; 11 subcutaneous model

| Group | Dosage mg/kg | Tumor volume ($\bar{x} \pm S$) | Relative tumor volume ($\bar{x} \pm S$) | TGI (%) | T/C (%) | P value (compared to control group) |
|---|---|---|---|---|---|---|
| Vehicle control group | | 2086.72 ± 368.80 | 8.51 ± 1.21 | | | |
| Compound of formula I | 25 | 600.39 ± 32.88 | 2.54 ± 0.19 | 70.2 | 29.8 | <0.001 |

Note:
1. Data were expressed as "mean ± standard error";
2. T/C % = $T_{RTV}/C_{RTV}$ × 100%; TGI % = (1 − T/C) × 100%.

Experimental Example 6: Human Platelet Toxicity Study (Caspase-3 Activity Assay)

10 mL of human whole blood was collected using a heparin sodium anticoagulation tube, mixed well by turning upside down, and centrifuged at 90 g for 10 min. The supernatant was collected and centrifuged at 1950 g for 10 min. The supernatant was discarded, and the residue was resuspended in 4 mL of PBS, and centrifuged at 1190 g for 5 min. The procedure was repeated once. The supernatant was discarded, and the platelets were resuspended in PBS and adjusted to a density of 2-3×10$^8$ cells/mL. Cells were seeded into a 96-well plate at a density of 2-3×10$^7$ cells/mL and at 100 μL/well. 50 μL of control buffer was added to each negative control well, and 50 μL of compound at a corresponding concentration was added to each compound well to adjust the final concentration of the compound to 2.5 μM or 1 μM, followed by incubation in an incubator at 37° C. for 90 min. The liquids in the 96-well plate were transferred to 1.5 mL centrifuge tubes. The liquids were centrifuged at 4° C., 6000 g for 5 min, the supernatant was discarded, and the liquids were placed on ice for later use. 5× lysis buffer was diluted into 1× lysis buffer with water in the kit, and protease inhibitor cocktail was added in a 1:200 ratio to prepare a lysis mixture for later use. 40 μL of lysis mixture was added to each centrifuge tube, and the platelets at the bottom were resuspended using a pipette. The suspension was lysed on ice for 15-20 min and centrifuged at 4° C. and 14,000 g for 10 min. The sample was sub-packaged for later use. 10× assay buffer was diluted into 1× assay buffer with water in the kit, and substrate Ac-DEVD-AMC was added in a 1:600 ratio to prepare a reaction mixture. 5 μL of assay buffer and 40 μL of reaction mixture were added to each blank control well. 5 μL of control platelet lysate and 40 μL of reaction mixture were added to each negative control well. 5 μL of platelet lysate and 40 μL of reaction mixture were added to each compound well. In this procedure, 40 μL of reaction mixture was added at last. The resulting mixture was mixed gently, and the plate was read by a PE Envision multi-functional microplate reader (excitation: 360 nm, emission: 460 nm) once every 10 min for 6 times. Caspase-3 activity was determined based on the intensity of the released AMC fluorescence, that is the slope of the fitted line to which each well corresponds represents Caspase activity (all data were normalized and the reference was ABT-199). The results are shown in Table 18.

TABLE 18

Effect of the compound on human platelet caspase-3 activity

| | Slope | |
|---|---|---|
| Compound | Compound concentration 2.5 μM | Compound concentration 1 μM |
| Negative | 0.03 | 0.04 |
| Compound of formula I | 0.94 | 0.59 |

Note:
Data were normalized.

The invention claimed is:
1. A crystalline form of a compound of formula I,

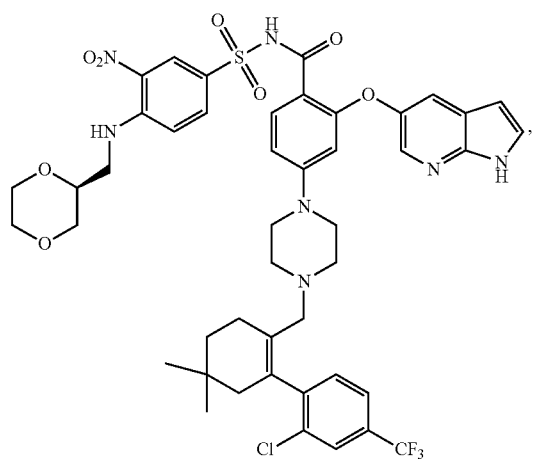

wherein the crystalline form is selected from the group consisting of the following crystalline form:
 a crystalline form having peaks at 2θ of 5.01, 6.61, 8.12 or 20.13±0.2° in an X-ray powder diffraction pattern;
 a crystalline form having peaks at 2θ of 5.31, 12.64, 19.08 or 24.21±0.2° in an X-ray powder diffraction pattern;
 a crystalline form having peaks at 2θ of 5.52, 7.56, 9.22, 11.04 or 17.43±0.2° in an X-ray powder diffraction pattern;
 a crystalline form having peaks at 2θ of 4.78, 12.83, 16.24 or 22.33±0.2° in an X-ray powder diffraction pattern;
 a crystalline form having peaks at 2θ of 4.22, 10.72, 15.17 or 15.65±0.2° in an X-ray powder diffraction pattern;

a crystalline form having peaks at 2θ of 4.54, 9.08 or 19.24±0.2° in an X-ray powder diffraction pattern;
a crystalline form having peaks at 2θ of 3.84, 10.39, 13.39 or 20.63±0.2° in an X-ray powder diffraction pattern; or
a crystalline form having peaks at 2θ of 4.65, 12.23, 14.09 or 22.04±0.2° in an X-ray powder diffraction pattern.

2. The crystalline form of the compound of formula I according to claim 1, wherein
the crystalline form has peaks at 2θ of 5.01, 6.61, 8.12, 10.21, 14.89, 16.63 or 20.13±0.2° in an X-ray powder diffraction pattern;
or, the crystalline form has at least 7 or at least 8 diffraction peaks at 2θ selected from the group consisting of 5.01, 6.61, 8.12, 10.21, 12.88, 14.89, 16.63, 20.13 or 21.01±0.2° in an X-ray powder diffraction pattern;
or, the crystalline form has peaks at 2θ of 5.01, 6.61, 8.12, 10.21, 12.88, 14.89, 16.63, 20.13 or 21.01±0.2° in an X-ray powder diffraction pattern;
or, the crystalline form has peaks at 2θ of 5.01, 6.61, 8.12, 10.21, 12.88, 13.74, 14.89, 16.63, 18.58, 20.13, 21.01 or 26.20±0.2° in an X-ray powder diffraction pattern;
or the crystalline form has an X-ray powder diffraction pattern shown in FIG. 1.

3. The crystalline form of the compound of formula I according to claim 1, wherein
the crystalline form has at least 6 or at least 7 diffraction peaks at 2θ selected from the group consisting of 5.31, 10.65, 12.64, 14.23, 19.08, 19.91, 22.71 or 24.21±0.2° in an X-ray powder diffraction pattern;
or, the crystalline form has peaks at 2θ of 5.31, 10.65, 12.64, 14.23, 19.08, 19.91, 22.71 or 24.21±0.2° in an X-ray powder diffraction pattern;
or, the crystalline form has peaks at 2θ of 5.31, 9.80, 10.65, 12.12, 12.64, 14.23, 16.04, 18.13, 19.08, 19.91, 22.71, 24.21 or 25.93±0.2° in an X-ray powder diffraction pattern;
or, the crystalline form has peaks at 2θ of 5.31, 9.80, 10.65, 12.12, 12.64, 13.57, 13.82, 14.23, 15.17, 16.04, 17.64, 18.13, 19.08, 19.91, 20.34, 22.71, 22.99, 23.45, 24.21, 25.65 or 25.93±0.2° in an X-ray powder diffraction pattern;
or, the crystalline form has peaks at 2θ of 5.31, 9.50, 9.80, 10.65, 11.41, 12.12, 12.64, 13.57, 13.82, 14.23, 15.17, 16.04, 16.64, 17.10, 17.64, 18.13, 18.33, 18.73, 19.08, 19.60, 19.91, 20.34, 21.22, 21.93, 22.71, 22.99, 23.45, 24.21, 25.65 or 25.93±0.2° in an X-ray powder diffraction pattern;
or the crystalline form has an X-ray powder diffraction pattern shown in FIG. 4.

4. The crystalline form of the compound of formula I according to claim 3, wherein the crystalline form has an endothermic peak with an onset point at 179.42±5° C. in a DSC pattern;
or the crystalline form has a DSC pattern shown in FIG. 5.

5. The crystalline form of the compound of formula I according to claim 1, wherein
the crystalline form has at least 7 or at least 8 diffraction peaks at 2θ selected from the group consisting of 5.52, 7.56, 8.29, 9.22, 11.04, 15.81, 17.43, 18.51 or 22.59±0.2° in an X-ray powder diffraction pattern;
or, the crystalline form has peaks at 2θ of 5.52, 7.56, 8.29, 9.22, 11.04, 15.81, 17.43, 18.51 or 22.59±0.2° in an X-ray powder diffraction pattern;
or, the crystalline form has peaks at 2θ of 5.52, 7.56, 8.29, 9.22, 11.04, 15.17, 15.81, 17.43, 18.51 or 20.40±0.2° in an X-ray powder diffraction pattern;
or, the crystalline form has peaks at 2θ of 5.52, 7.56, 8.29, 9.22, 11.04, 15.17, 15.81, 17.00, 17.43, 18.51, 19.70, 20.01, 20.40, 20.75 or 22.59±0.2° in an X-ray powder diffraction pattern;
or, the crystalline form has peaks at 2θ of 5.52, 7.56, 8.29, 9.22, 10.66, 11.04, 12.94, 14.69, 15.17, 15.81, 16.63, 17.00, 17.43, 18.51, 19.70, 20.01, 20.40, 20.75, 22.59, 25.88 or 26.12±0.2° in an X-ray powder diffraction pattern;
or the crystalline form has an X-ray powder diffraction pattern shown in FIG. 7.

6. The crystalline form of the compound of formula I according to claim 5, wherein the crystalline form has an endothermic peak with an onset point at 205.65±5° C. in a DSC pattern;
or the crystalline form has a DSC pattern shown in FIG. 8.

7. The crystalline form of the compound of formula I according to claim 1, wherein
the crystalline form has at least 6 or at least 7 diffraction peaks at 2θ selected from the group consisting of 4.78, 10.52, 12.83, 16.24, 18.44, 19.41, 22.33 or 23.20±0.2° in an X-ray powder diffraction pattern;
or, the crystalline form has peaks at 2θ of 4.78, 10.52, 12.83, 16.24, 18.44, 19.41, 22.33 or 23.20±0.2° in an X-ray powder diffraction pattern;
or, the crystalline form has peaks at 2θ of 4.78, 9.63, 10.52, 12.83, 13.48, 15.79, 16.24, 17.89, 18.44, 19.41, 19.61, 22.33 or 23.20±0.2° in an X-ray powder diffraction pattern;
or, the crystalline form has peaks at 2θ of 4.78, 7.46, 9.63, 10.52, 11.17, 12.83, 13.48, 14.42, 15.79, 16.24, 17.89, 18.44, 19.41, 19.61, 20.44, 22.33, 23.20, 26.48 or 27.05±0.2° in an X-ray powder diffraction pattern;
or the crystalline form has an X-ray powder diffraction pattern shown in FIG. 10.

8. The crystalline form of the compound of formula I according to claim 7, wherein the crystalline form has an endothermic peak with an onset point at 176.47±5° C. in a DSC pattern;
or the crystalline form has a DSC pattern shown in FIG. 11.

9. The crystalline form of the compound of formula I according to claim 1, wherein
the crystalline form has at least 7 or at least 8 diffraction peaks at 2θ selected from the group consisting of 4.22, 10.72, 14.62, 15.17, 15.65, 17.54, 19.55, 19.80 or 21.50±0.2° in an X-ray powder diffraction pattern;
or, the crystalline form has peaks at 2θ of 4.22, 10.72, 14.62, 15.17, 15.65, 17.54, 19.55, 19.80 or 21.50±0.2° in an X-ray powder diffraction pattern;
or, the crystalline form has peaks at 2θ of 4.22, 10.72, 13.82, 14.62, 15.17, 15.65, 16.92, 17.54, 19.55, 19.80, 21.50, 22.76, 23.35 or 26.06±0.2° in an X-ray powder diffraction pattern;
or, the crystalline form has peaks at 2θ of 4.22, 7.99, 8.75, 9.91, 10.72, 11.66, 12.75, 13.82, 14.62, 15.17, 15.65, 16.24, 16.92, 17.54, 19.04, 19.55, 19.80, 20.18, 21.50, 22.76, 23.35, 26.06, 26.91, 29.82 or 30.56±0.2° in an X-ray powder diffraction pattern;
or the crystalline form has an X-ray powder diffraction pattern shown in FIG. 13.

10. The crystalline form of the compound of formula I according to claim 9, wherein the crystalline form has an endothermic peak with an onset point at 145.48±5° C. in a DSC pattern;
or the crystalline form has a DSC pattern shown in FIG. 14.

11. The crystalline form of the compound of formula I according to claim 1, wherein
the crystalline form has peaks at 2θ of 4.54, 9.08, 14.90, 18.25, 19.24, 22.86 or 23.50±0.2° in an X-ray powder diffraction pattern;
or, the crystalline form has at least 8, at least 9 or at least 10 diffraction peaks at 2θ selected from the group consisting of 4.54, 9.08, 13.66, 14.90, 17.46, 18.25, 19.24, 22.86, 23.50, 24.75 or 27.51±0.2° in an X-ray powder diffraction pattern;
or, the crystalline form has peaks at 2θ of 4.54, 9.08, 13.66, 14.90, 17.46, 18.25, 19.24, 22.86, 23.50, 24.75 or 27.51±0.2° in an X-ray powder diffraction pattern;
or, the crystalline form has peaks at 2θ of 4.54, 8.20, 9.08, 13.66, 13.97, 14.51, 14.90, 15.51, 16.63, 17.46, 18.25, 19.24, 19.82, 21.11, 22.37, 22.86, 23.50, 24.75 or 27.51±0.2° in an X-ray powder diffraction pattern;
or the crystalline form has an X-ray powder diffraction pattern shown in FIG. 16.

12. The crystalline form of the compound of formula I according to claim 11, wherein the crystalline form has an endothermic peak with an onset point at 171.37±5° C. in a DSC pattern;
or the crystalline form has a DSC pattern shown in FIG. 17.

13. The crystalline form of the compound of formula I according to claim 1, wherein
the crystalline form has at least 6 or at least 7 diffraction peaks at 2θ selected from the group consisting of 3.84, 10.39, 11.22, 13.39, 15.55, 16.78, 20.01 or 20.63±0.2° in an X-ray powder diffraction pattern;
or, the crystalline form has peaks at 2θ of 3.84, 10.39, 11.22, 13.39, 15.55, 16.78, 20.01 or 20.63±0.2° in an X-ray powder diffraction pattern;
or, the crystalline form has peaks at 2θ of 3.84, 7.72, 9.56, 10.39, 11.22, 12.47, 13.39, 14.01, 15.55, 16.78, 19.02, 20.01 or 20.63±0.2° in an X-ray powder diffraction pattern;
or, the crystalline form has peaks at 2θ of 3.84, 6.69, 7.72, 9.56, 10.39, 11.22, 12.47, 13.39, 14.01, 15.00, 15.55, 16.78, 18.59, 19.02, 19.47, 20.01, 20.63, 22.50, 23.44, 23.69, 24.11, 25.48 or 26.47±0.2° in an X-ray powder diffraction pattern;
or the crystalline form has an X-ray powder diffraction pattern shown in FIG. 19.

14. The crystalline form of the compound of formula I according to claim 1, wherein
the crystalline form has at least 7 or at least 8 diffraction peaks at 2θ selected from the group consisting of 4.65, 9.36, 12.23, 13.33, 14.09, 17.27, 19.37, 22.04 or 22.95±0.2° in an X-ray powder diffraction pattern;
or, the crystalline form has peaks at 2θ of 4.65, 9.36, 12.23, 13.33, 14.09, 17.27, 19.37, 22.04 or 22.95±0.2° in an X-ray powder diffraction pattern;
or, the crystalline form has peaks at 2θ of 4.65, 9.36, 10.41, 12.23, 13.33, 14.09, 17.27, 18.88, 19.37, 20.58, 22.04, 22.49, 22.95 or 23.69±0.2° in an X-ray powder diffraction pattern;
or, the crystalline form has peaks at 2θ of 4.65, 7.20, 9.36, 10.41, 11.12, 12.23, 13.33, 14.09, 15.44, 16.41, 16.68, 17.27, 18.31, 18.88, 19.37, 20.58, 22.04, 22.49, 22.95, 23.69 or 25.12±0.2° in an X-ray powder diffraction pattern;
or the crystalline form has an X-ray powder diffraction pattern shown in FIG. 20.

15. A crystalline composition, comprising the crystalline form of the compound of formula I according to claim 1, wherein the crystalline form of the compound of formula I according to claim 1 accounts for 50% or more of the crystalline composition by weight.

16. A pharmaceutical composition, comprising the crystalline form of the compound of formula I according to claim 1 or a crystalline composition comprising the crystalline form of the compound of formula I according to claim 1.

17. A method for treating a disease associated with anti-apoptotic protein BCL-2 in a mammal, comprising: administering to the mammal in need a therapeutically effective amount of the crystalline form of the compound of formula I according to claim 1, a crystalline composition comprising the crystalline form of the compound of formula I according to claim 1 or a pharmaceutical composition comprising the crystalline form of the compound of formula I according to claim 1.

18. The method according to claim 17, wherein the disease associated with anti-apoptotic protein BCL-2 is a cancer.

19. The method according to claim 17, wherein the disease associated with anti-apoptotic protein BCL-2 is acute lymphocytic leukemia.

20. The crystalline form of the compound of formula I according to claim 1, wherein the crystalline form of the compound of formula I is present in a non-solvate crystalline form or a solvate crystalline form.

* * * * *